United States Patent
Park et al.

(10) Patent No.: US 9,990,742 B2
(45) Date of Patent: Jun. 5, 2018

(54) APPARATUS FOR PROCESSING MEDICAL IMAGE AND METHOD OF PROCESSING MEDICAL IMAGE THEREOF

(71) Applicant: SAMSUNG ELECTRONICS CO., LTD., Suwon-si (KR)

(72) Inventors: Jun-young Park, Suwon-si (KR); Nasir Desai, Suwon-si (KR); Yeon-mo Jeong, Seoul (KR); Abhinav Mehrotra, Sitapur (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 14/862,363

(22) Filed: Sep. 23, 2015

(65) Prior Publication Data
US 2016/0086357 A1 Mar. 24, 2016

(30) Foreign Application Priority Data

Sep. 23, 2014 (KR) .................. 10-2014-0127190
May 27, 2015 (KR) .................. 10-2015-0073926

(51) Int. Cl.
*G06K 9/00* (2006.01)
*G06T 11/00* (2006.01)

(52) U.S. Cl.
CPC ....... *G06T 11/006* (2013.01); *G06T 2211/412* (2013.01)

(58) Field of Classification Search
USPC .................................................. 382/128–134
See application file for complete search history.

(56) References Cited

U.S. PATENT DOCUMENTS

| 6,229,870 B1 * | 5/2001 | Morgan ................. A61B 6/032 378/4 |
| 6,701,341 B1 | 3/2004 | Wu et al. |
| 7,119,810 B2 | 10/2006 | Sumanaweera et al. |
| 2002/0025172 A1 | 2/2002 | Tsuda et al. |

(Continued)

FOREIGN PATENT DOCUMENTS

| KR | 10-2012-0031759 A | 4/2012 |
| KR | 101401523 B1 | 6/2014 |
| KR | 10-2014-0089223 A | 7/2014 |

OTHER PUBLICATIONS

Written Opinion (PCT/ISA/237) dated Dec. 29, 2015 issued by International Searching Authority in counterpart International Application No. PCT/KR2015/009912.

(Continued)

*Primary Examiner* — Alex Liew
(74) *Attorney, Agent, or Firm* — Sughrue Mion, PLLC

(57) ABSTRACT

An apparatus for processing a medical image includes an image processor including a plurality of processors, the plurality of processors configured to reconstruct a cross-sectional image of an object by performing a first operation having a first priority and a second operation having a second priority that is lower than the first priority, and a controller configured to monitor whether a malfunction occurs among the plurality of processors, and configured to assign, to at least one of the plurality of processors, at least one of the first operation and the second operation to be performed, based on a result of monitoring of the plurality of processors.

33 Claims, 20 Drawing Sheets

(56) References Cited

U.S. PATENT DOCUMENTS

| | | | |
|---|---|---|---|
| 2002/0194531 A1* | 12/2002 | Lerman | G06F 11/008 714/11 |
| 2004/0030235 A1 | 2/2004 | Sasaki et al. | |
| 2009/0031319 A1* | 1/2009 | Fecioru | G06F 9/4887 718/103 |
| 2010/0049268 A1* | 2/2010 | Martins | G06F 11/2025 607/9 |
| 2012/0079498 A1 | 3/2012 | Kim et al. | |
| 2014/0191753 A1 | 7/2014 | Oh et al. | |

OTHER PUBLICATIONS

International Search Report (PCT/ISA/210) dated Dec. 29, 2015 issued by International Searching Authority in counterpart International Application No. PCT/KR2015/009912.

* cited by examiner

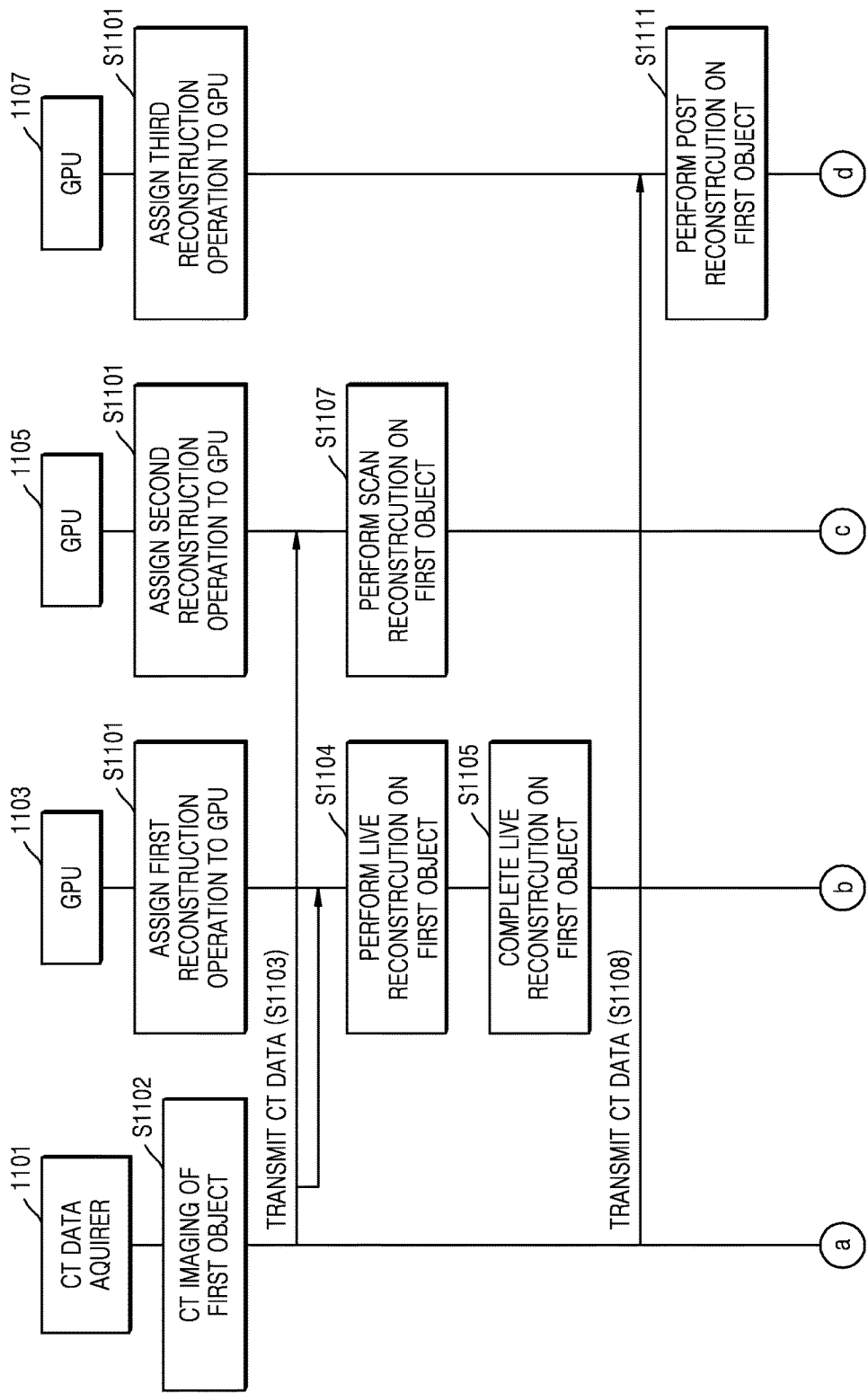

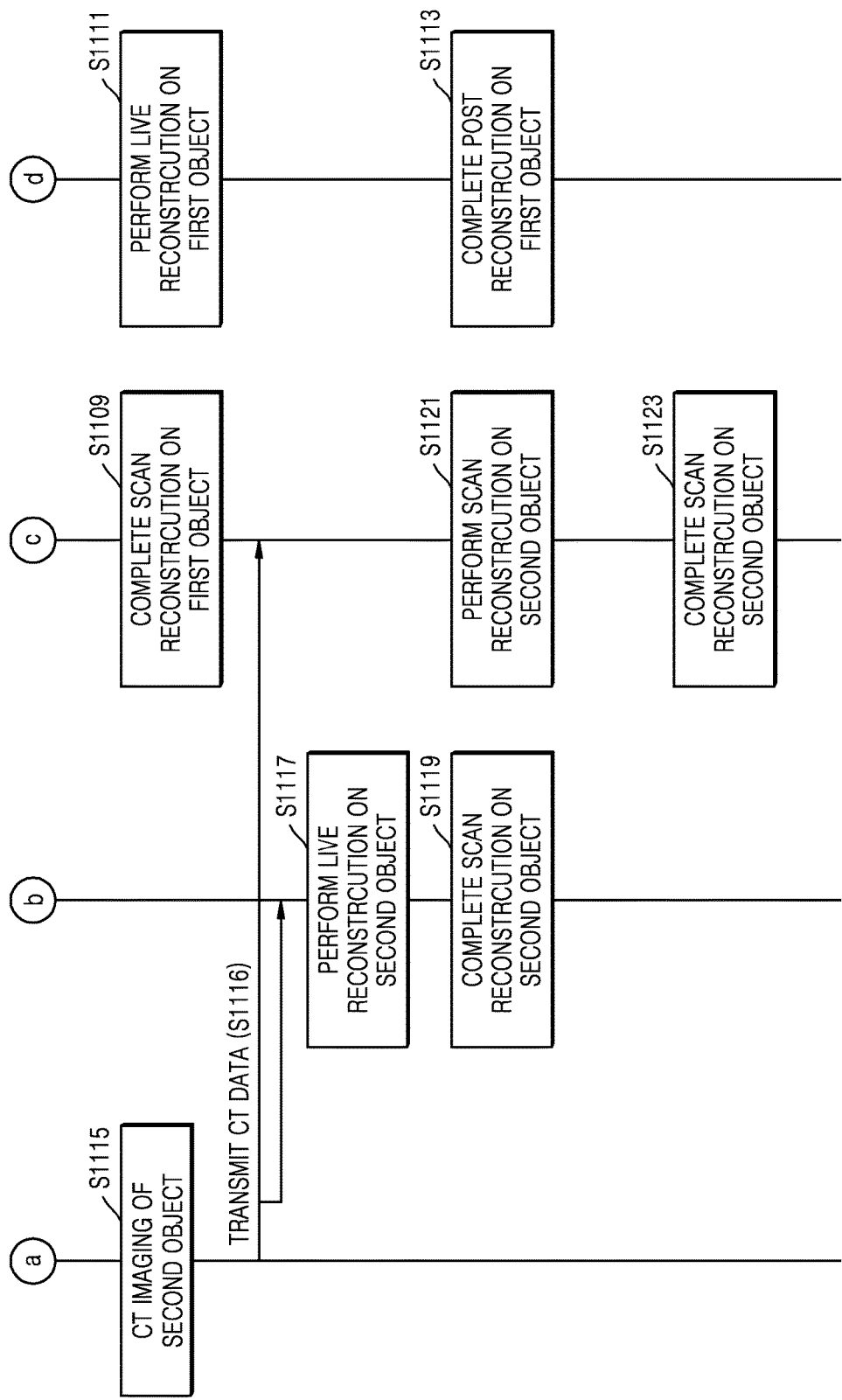

APPARATUS FOR PROCESSING MEDICAL IMAGE AND METHOD OF PROCESSING MEDICAL IMAGE THEREOF

CROSS-REFERENCE TO RELATED APPLICATIONS

This application claims priority from Korean Patent Application No. 10-2014-0127190, filed on Sep. 23, 2014, and Korean Patent Application No. 10-2015-0073926, filed on May 27, 2015, in the Korean Intellectual Property Office, the disclosures of which are incorporated herein in their entireties by reference.

BACKGROUND

1. Field

Apparatuses and methods consistent with exemplary embodiments relate to an apparatus for processing a medical image and a method of processing a medical image thereof, and more particularly, to a computed tomography (CT) image processing apparatus for obtaining a cross-sectional image reconstructed by using a plurality of graphics processor units (GPUs) and a method of processing a CT image thereof.

2. Description of the Related Art

Computed tomography (CT) image processing apparatuses are used to obtain an image of the internal structure of an object. The CT image processing apparatuses are non-invasive and enable users to view an image of an object after capturing and processing the image including structural details of a body, the internal organs, the flow of body fluids, etc. Users, including doctors, may diagnose medical conditions and diseases by using images generated by the CT image processing apparatuses.

A CT image processing apparatus needs to quickly process a massive amount of data during a reconstruction process in which the CT image processing apparatus obtains a cross-sectional image based on data acquired through CT imaging. Therefore, a CT image processing apparatus executes a task of processing an image, which involves a massive amount of data, by using a field programmable gate array (FPGA) and a multi-central processing unit (Multi-CPU).

In addition, diagnoses using CT-imaging technology are frequently used in emergency situations, compared to types of diagnoses using other medical equipment. Therefore, there may be circumstances in which users need to monitor the medical conditions of a patient in real time while the CT imaging is being performed. Therefore, methods are introduced to reconstruct the cross-sectional images by using graphics processor units (GPUs) which have more enhanced processing capacities than conventional central processing units (CPUs).

Furthermore, the CT image processing apparatuses may boost efficiency by using a Multi-GPU architecture, which includes a plurality of GPUs, when reconstructing a cross-sectional image, to further boost image reconstruction speed.

However, the plurality of GPUs included as part of the Multi-GPU architecture perform the task of an image processing interdependently. Therefore, when the GPUs are used in the reconstruction of the cross-sectional image, if at least one of the plurality of the GPUs malfunctions, the CT image processing apparatuses may have difficulty in reconstructing an intended cross-sectional image.

SUMMARY

One or more exemplary embodiments provide an apparatus for obtaining a medical image, which may obtain a cross-sectional image of an object at a normal pace even when there is at least one malfunctioning graphics processor unit (GPU) among a plurality of GPUs that are used to reconstruct the cross-sectional image of the object by using data obtained from computed tomography (CT) imaging.

One or more exemplary embodiments provide an apparatus for obtaining a medical image, which may efficiently reconstruct various types of cross-sectional images based on priorities in executing the reconstruction of various types of cross-sectional images by using the plurality of GPUs.

One or more exemplary embodiments provide an apparatus for obtaining a medical image, which may efficiently assign a task of reconstructing various types of cross-sectional images based on priorities according to various types of reconstructing operation of cross-sectional images, even when there is at least one malfunctioning GPU among a plurality of GPUs.

Additional aspects will be set forth in part in the description which follows and, in part, will be apparent from the description, or may be learned by practice of the presented exemplary embodiments.

According to an aspect of an exemplary embodiment, provided is an apparatus for processing a medical image, the apparatus including: an image processor including a plurality of processors, the plurality of processors configured to reconstruct a cross-sectional image of an object by performing a first operation having a first priority and a second operation having a second priority that is lower than the first priority; and a controller configured to monitor whether a malfunction occurs among the plurality of processors, and configured to assign, to at least one of the plurality of processors, at least one of the first operation and the second operation to be performed, based on a result of monitoring of the plurality of processors.

The controller may be configured to assign the at least one of the first operation and the second operation to the at least one of the plurality of processors, such that the first operation is firstly performed.

When the controller may be configured to detect a malfunction in a processor based on the result of the monitoring, the controller is configured to assign the at least one of the first operation and the second operation to at least one among the plurality of processors except for the processor in which the malfunction is detected.

The apparatus may further include a displayer configured to display the reconstructed cross-sectional image.

The plurality of processors may be configured to reconstruct the cross-sectional image of the object based on computed tomography (CT) data obtained by performing a CT imaging on the object.

The displayer may be configured to display a first cross-sectional image generated by using the first operation while the CT imaging is being performed on the object.

The displayer may be configured to display a second cross-sectional image generated by the second operation, the second operation being performed on the object after the CT imaging of the object is completed.

The second operation may include a scan reconstruction, and the scan reconstruction is performed by reconstructing the second cross-sectional image by using the CT data in a manner different from reconstructing the first cross-sectional image by using the first operation.

The second operation may further include post reconstruction by which the second cross-sectional image of the object is generated based on at least one of the CT data and the first cross-sectional image.

The controller may be configured to assign the second operation to the at least one of the plurality of processors, and configured to control the at least one of the plurality of processors to perform the post reconstruction after performing the scan reconstruction.

The controller may be configured to assign the first operation to a greater number of a processor than a number of a processor to which the second operation is assigned.

The controller may be configured to assign the at least one of the first operation and the second operation to each of the plurality of processors based on a total number of the plurality of processors and a number of a processor in which the malfunction is detected.

The controller may be configured to maintain a number of a processor to which the first operation is assigned regardless of whether the malfunction occurs among the plurality of processors.

The controller may be configured to maintain a speed at which the cross-sectional image of the object is generated by the first operation regardless of whether the malfunction occurs among the plurality of processors.

The apparatus may further include an input unit configured to receive an input indicating the second operation, wherein the image processor is configured to determine an image reconstruction method of the second operation, based on the input.

According to an aspect of an exemplary embodiment, provided is a method of processing a medical image, the method including: detecting whether a malfunction occurs among a plurality of processors, the plurality of processors configured to reconstruct a cross-sectional image of an object, and based on a result of the detecting, assigning, to at least one of the plurality of processors, at least one of a first operation having a first priority and a second operation having a second priority that is lower than the first priority, the first operation and the second operation being performed to reconstruct the cross-sectional image of the object.

The assigning may include assigning the at least one of the first operation and the second operation to the at least one of the plurality of processors, such that the first operation is firstly performed.

The assigning may include assigning, when a malfunction is detected in a processor based on the result of the detecting, the at least one of the first operation and the second operation to at least one among the plurality of processors except for the processor in which the malfunction is detected.

The method may further include displaying the reconstructed cross-sectional image.

The plurality of processors may be configured to reconstruct the cross-sectional image of the object based on CT data obtained through a CT imaging of the object.

The displaying may include displaying a first cross-sectional image generated by the first operation while the CT imaging is being performed on the object.

The displaying may include displaying a second cross-sectional image obtained through the second operation, the second operation being performed on the object after the CT imaging is completed.

The second operation may include scan reconstruction, and the scan reconstruction is performed by reconstructing the second cross-sectional image by using the CT data in a manner different from reconstructing the first cross-sectional image by using the first operation.

The second operation may further include post reconstruction by which the second cross-sectional image of the object is generated based on at least one of the CT data and the first cross-sectional image.

When the assigning includes assigning the second operation to the at least one of the plurality of processors, the at least one of the plurality of processors may be configured to perform the post reconstruction after the scan reconstruction is completed.

A number of a processor assigned to the first operation may be greater than a number of a processor assigned to the second operation.

The assigning may include assigning the at least one of the first operation and the second operation to each of the plurality of processors based on a total number of the plurality of processors and a number of a processor in which the malfunction is detected.

A number of a processor assigned to the first operation may be maintained regardless of whether the malfunction occurs among the plurality of processors.

A speed at which the cross-sectional image of the object is generated by the first operation may be maintained regardless of whether the malfunction occurs among the plurality of processors.

The method may further include receiving an input indicating the second operation, and determining an image reconstruction method of the second operation, based on the input.

According to an aspect of an exemplary embodiment, provided is a tomography apparatus including: a data acquirer configured to acquire an image of an object by performing a tomography scan on the object; and an image processor including a plurality of processors and configured to reconstruct a cross-section image of the object by performing two or more different reconstruction operations on the object, wherein a number of a processor that performs a certain reconstruction operation is determined based on a total number of the plurality of processors and a number of a processor in which a malfunction is detected.

The two or more different reconstruction operations may differ from each other with respect to at least one from among an image reconstruction method, an image processing method, and an image displaying method.

A number of a processor that performs a first reconstruction, among the plurality of processors except for the processor in which the malfunction is detected, may be greater than a number of a processor that performs a second reconstruction operation.

BRIEF DESCRIPTION OF THE DRAWINGS

The above and/or other aspects will be more apparent by describing certain example embodiments with reference to the accompanying drawings in which:

FIGS. 11A and 11B are sequence diagrams of a method of processing a CT image by a CT image processing apparatus according to an exemplary embodiment;

FIGS. 12A and 12B are sequence diagrams of a method of processing a CT image by a CT image processing apparatus according to another exemplary embodiment.

DETAILED DESCRIPTION

Figure 1:
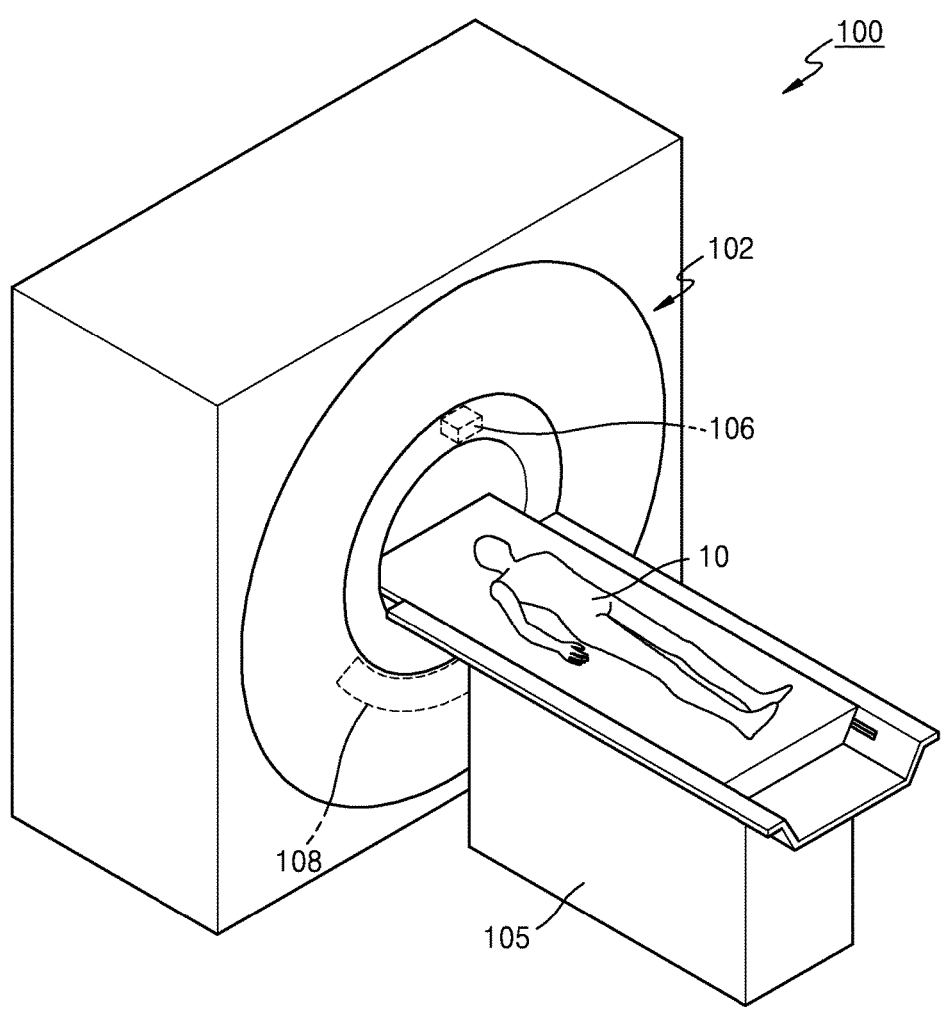
FIG. 1 schematically illustrates a computed tomography (CT) system according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. In the following description, well-known functions or constructions are not described in detail so as not to obscure the exemplary embodiments with unnecessary detail.

One or more exemplary embodiments and methods of accomplishing the same may be understood more readily by reference to the following detailed description of the exemplary embodiments and the accompanying drawings. In this regard, the exemplary embodiments may have different forms and should not be construed as being limited to the descriptions set forth herein. Rather, these embodiments are provided so that this disclosure will be thorough and complete and will fully convey the concept of the exemplary embodiments to one of ordinary skill in the art, and the disclosure will only be defined by the appended claims. Like reference numerals refer to like elements throughout the specification.

Hereinafter, the terms used in the specification will be briefly defined, and the exemplary embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part can further include other elements, not excluding the other elements. Also, the term "unit" in the exemplary embodiments means a software component or hardware component such as a field-programmable gate array (FPGA) or an application-specific integrated circuit (ASIC), and performs a specific function. However, the term "unit" is not limited to software or hardware. The "unit" may be formed to be in an addressable storage medium, or may be formed to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Throughout the specification, an "image" may mean multi-dimensional data formed of discrete image elements, e.g., pixels in a two-dimensional (2D) image and voxels in a three-dimensional (3D) image. For example, the image may include a medical image of an object which is captured by a computed tomography (CT) imaging apparatus.

Throughout the specification, a "CT image" may mean an image generated by synthesizing a plurality of X-ray images that are obtained by photographing an object while a computed tomography (CT) imaging apparatus rotates around at least one axis with respect to the object.

Furthermore, in the present specification, an "object" may be a human, an animal, or a part of a human or animal. For example, the object may be an organ (e.g., the liver, heart, womb, brain, breast, or abdomen), a blood vessel, or a combination thereof. The object may be a phantom. The phantom means a material having a density, an effective atomic number, and a volume that are approximately the same as those of an organism. For example, the phantom may be a spherical phantom having properties similar to the physical body.

Throughout the specification, a "user" may be, but is not limited to, a medical expert including a medical doctor, a nurse, a medical laboratory technologist, a medial image expert, or a technician who repairs a medical apparatus.

Since a CT system is capable of providing a cross-sectional image of an object, the CT system may distinctively express an inner structure, e.g., an organ such as a kidney or a lung, of the object, compared to a general X-ray imaging apparatus.

The CT system may obtain a plurality of pieces of image data with a thickness not more than 2 mm several tens to several hundred times per second and then may process the plurality of pieces of image data, so that the CT system may provide a relatively accurate cross-sectional image of the object. According to the related art, only a horizontal cross-sectional image of the object can be obtained, but this issue has been overcome due to various image reconstruction methods. Examples of 3D image reconstruction methods are as below.

Shade surface display (SSD)—an initial 3D imaging method of displaying only voxels having a predetermined Hounsfield Units (HU) value.

Maximum intensity projection (MIP)/minimum intensity projection (MinIP)—a 3D imaging method of displaying only voxels having the greatest or smallest HU value from among voxels that construct an image.

Volume rendering (VR)—an imaging method capable of adjusting a color and transmittance of voxels that constitute an image, according to areas of interest.

Virtual endoscopy—a method that allows endoscopy observation in a 3D image that is reconstructed by using the VR method or the SSD method.

Multi-planar reformation (MPR)—a method of reconstructing an image into a different cross-sectional image. A user may reconstruct an image in any desired direction.

Editing—a method of editing adjacent voxels to allow a user to easily observe an area of interest in volume rendering.

Voxel of interest (VOI)—a method of displaying only a selected area in volume rendering.

A CT system 100 according to an exemplary embodiment will now be described with reference to FIG. 1. The CT system 100 may include various types of devices.

FIG. 1 schematically illustrates the CT system 100. Referring to FIG. 1, the CT system 100 may include a gantry 102, a table 105, an X-ray generator 106, and an X-ray detector 108.

The gantry 102 may include the X-ray generator 106 and the X-ray detector 108.

An object 10 may be positioned on the table 105.

The table 105 may move in a predetermined direction (e.g., at least one of up, down, right, and left directions) during a CT imaging procedure. Also, the table 105 may tilt or rotate by a predetermined angle in a predetermined direction.

The gantry 102 may also tilt by a predetermined angle in a predetermined direction.

Figure 2:
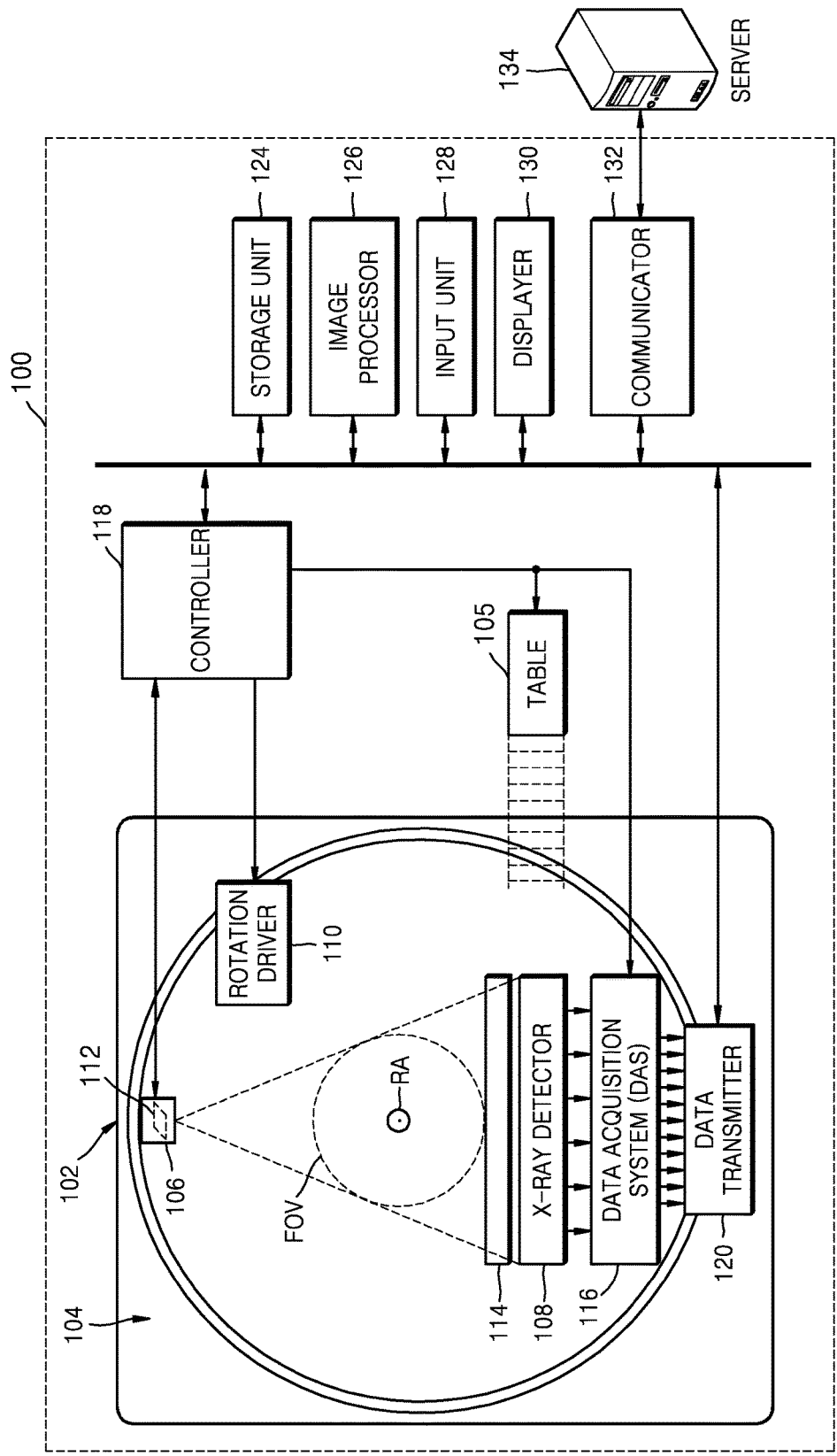
FIG. 2 is a view illustrating a structure of a CT system according to an exemplary embodiment.

FIG. 2 is a block diagram illustrating a structure of the CT system 100.

The CT system 100 may include the gantry 102, the table 105, a controller 118, a storage unit 124, an image processor 126, an input unit 128, a displayer 130, and a communicator 132.

As described above, the object 10 may be positioned on the table 105. In an exemplary embodiment, the table 105 may move in a predetermined direction (e.g., at least one of up, down, right, and left directions), and movement of the table 105 may be controlled by the controller 118.

The gantry 102 may include a rotating frame 104, the X-ray generator 106, the X-ray detector 108, a rotation driver 110, a data acquisition system (DAS) 116, and a data transmitter 120.

The gantry 102 may include the rotating frame 104 having a loop shape capable of rotating with respect to a predetermined rotation axis RA. Also, the rotating frame 104 may have a disc shape.

The rotating frame 104 may include the X-ray generator 106 and the X-ray detector 108 that are arranged to face each other to have a predetermined fields of view (FOV). The rotating frame 104 may also include an anti-scatter grid 114. The anti-scatter grid 114 may be positioned between the X-ray generator 106 and the X-ray detector 108.

In a medical imaging system, X-ray radiation that reaches the X-ray detector 108 (or a photosensitive film) includes not only attenuated primary radiation that is used to generate an image but also scattered radiation that deteriorates the quality of the generated image. To effectively transmit the primary radiation and to attenuate the scattered radiation, the anti-scatter grid 114 may be positioned between an object (or a patient) and the X-ray detector 108 (or the photosensitive film).

For example, the anti-scatter grid 114 may be formed by alternately stacking lead foil strips and an interspace material such as a solid polymer material, solid polymer, or a fiber composite material. However, the anti-scatter grid 114 is not limited thereto.

The rotating frame 104 may receive a driving signal from the rotation driver 110 and may rotate the X-ray generator 106 and the X-ray detector 108 at a predetermined rotation speed. The rotating frame 104 may receive the driving signal and power from the rotation driver 110 while the rotating frame 104 contacts the rotation driver 110 via a slip ring (not shown). Also, the rotating frame 104 may receive the driving signal and power from the rotation driver 110 via wireless communication.

The X-ray generator 106 may receive a voltage and current from a power distribution unit (PDU) (not shown) via a slip ring (not shown) and a high voltage generator (not shown), and may generate and emit an X-ray. When the high voltage generator applies predetermined voltage (hereinafter, referred to as a tube voltage) to the X-ray generator 106, the X-ray generator 106 may generate X-rays having a plurality of energy spectra that correspond to the tube voltage.

The X-ray generated by the X-ray generator 106 may be emitted in a predetermined form by using a collimator 112.

The X-ray detector 108 may be positioned to face the X-ray generator 106. The X-ray detector 108 may be positioned to face the X-ray generator 106. Each of the plurality of X-ray detecting devices may establish a channel with the X-ray generator 106 but the exemplary embodiments are not limited thereto.

The X-ray detector 108 may detect the X-ray that is generated by the X-ray generator 106 and transmitted through the object 10, and may generate an electrical signal corresponding to intensity of the detected X-ray.

The X-ray detector 108 may include an indirect-type X-ray detector for detecting radiation after converting the radiation into light, and a direct-type X-ray detector for detecting radiation after directly converting the radiation into electric charges. The indirect-type X-ray detector may use a scintillator. Also, the direct-type X-ray detector may use a photon counting detector. The DAS 116 may be connected to the X-ray detector 108. Electrical signals generated by the X-ray detector 108 may be acquired by the DAS 116. Electrical signals generated by the X-ray detector 108 may be acquired by wire or wirelessly by the DAS 116. Also, the electrical signals generated by the X-ray detector 108 may be provided to an analog-to-digital converter (not shown) via an amplifier (not shown).

According to thickness of a slice or the number of slices, some of a plurality of pieces of data collected by the X-ray detector 108 may be provided to the image processor 126 via the data transmitter 120, or the image processor 126 may select some of the plurality of pieces of data.

A digital signal (or a data collected by the X-ray detector 108) may be provided to the image processor 126 via the data transmitter 120. The digital signal may be provided to the image processor 126 by wire or wirelessly.

The controller 118 may control operations of the elements in the CT system 100. For example, the controller 118 may control operations of the table 105, the rotation driver 110, the collimator 112, the DAS 116, the storage unit 124, the image processor 126, the input unit 128, the displayer 130, the communicator 132, or the like.

The image processor 126 may receive data acquired by the DAS 116, via the data transmitter 120, and may perform pre-processing.

The pre-processing may include, for example, a process of correcting a sensitivity irregularity between channels and a process of correcting signal loss due to a rapid decrease in signal strength or due to the presence of an X-ray absorbing material such as metal.

Data output from the image processor 126 may be referred to as raw data or projection data. The projection data may be stored in the storage unit 124 with imaging conditions (e.g., the tube voltage, an imaging angle, etc.) during the acquisition of data.

The projection data may be a group of data values that correspond to the intensity of the X-ray that has passed through the object 10. For convenience of description, a group of a plurality of pieces of projection data that are simultaneously obtained from a plurality of channels at the same imaging angle is referred to as a projection data set.

The storage unit 124 may include at least one storage medium from among a flash memory-type storage medium, a hard disk-type storage medium, a multimedia card micro-type storage medium, card-type memories (e.g., a secure digital (SD) card, an extreme digital (XD) memory, and the like), a random access memory (RAM), a static random access memory (SRAM), a read-only memory (ROM), an electrically erasable programmable ROM (EEPROM), a programmable ROM (PROM), a magnetic memory, a magnetic disc, and an optical disc.

The image processor 126 may reconstruct a cross-sectional image of the object 10 by using the acquired projection data set. The cross-sectional image may be a 3D image. In other words, the image processor 126 may reconstruct a 3D image of the object 10 by using a cone beam reconstruction method or the like, based on the acquired projection data set.

The input unit 128 may receive an external input with respect to an X-ray tomography imaging condition, an image processing condition, or the like. For example, the X-ray tomography imaging condition may include tube voltages, an energy value setting with respect to a plurality of X-rays, a selection of an imaging protocol, a selection of an image reconstruction method, a setting of an FOV area, the number of slices, a slice thickness, a parameter setting with respect to image post-processing, or the like. Also, the image processing condition may include a resolution of an image, an attenuation coefficient setting for the image, setting for an image combining ratio, or the like.

The input unit 128 may include a device for receiving a predetermined input from an external source. For example, the input unit 128 may include a microphone, a keyboard, a mouse, a joystick, a touch pad, a touch pen, a voice recognition device, a gesture recognition device, or the like.

The displayer 130 may display an X-ray image reconstructed by the image processor 126.

Exchanges of data, power, or the like between the aforementioned elements may be performed by using, for example but is not limited to, at least one of wired communication, wireless communication, and optical communication.

The communicator 132 may perform communication with an external device, an external medical apparatus, etc. via a server 134 or the like.

Figure 3A:
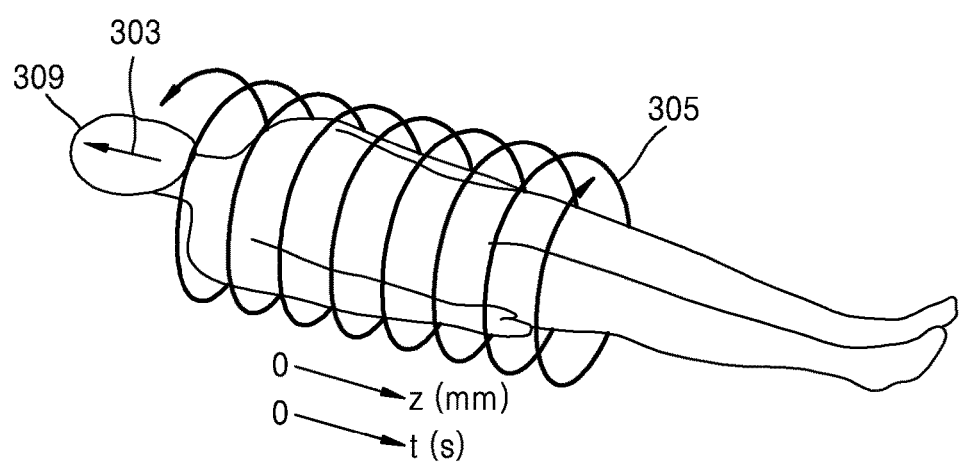
FIGS. 3A, 3B, and 3C are views illustrating a method of processing a cross-sectional image according to exemplary embodiments.
Figure 3B:
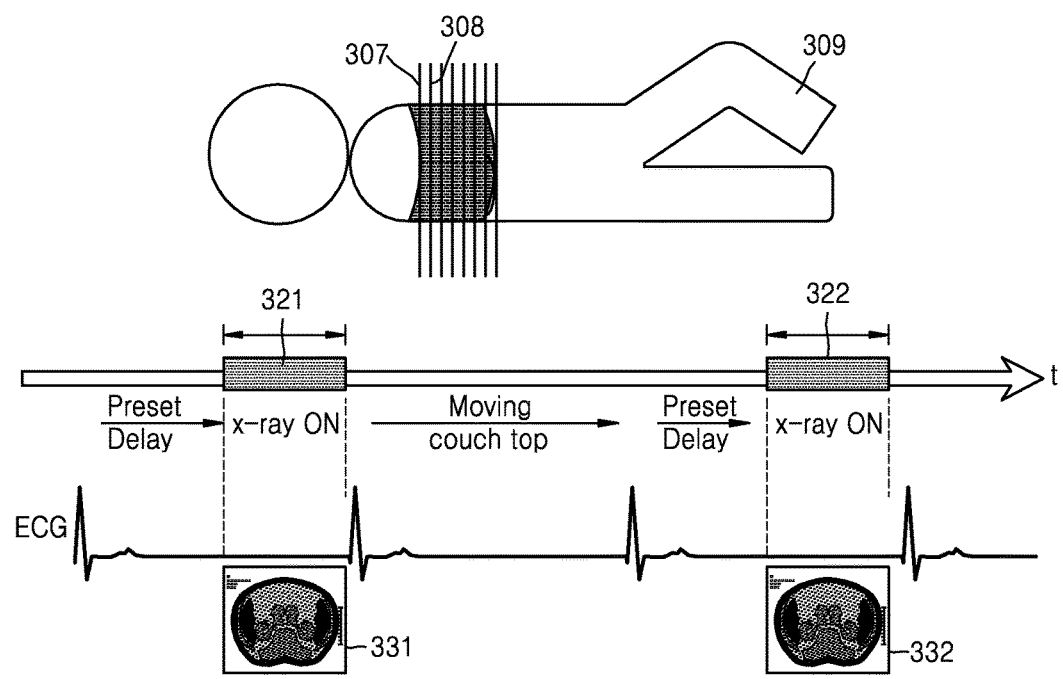
Figure 3C:
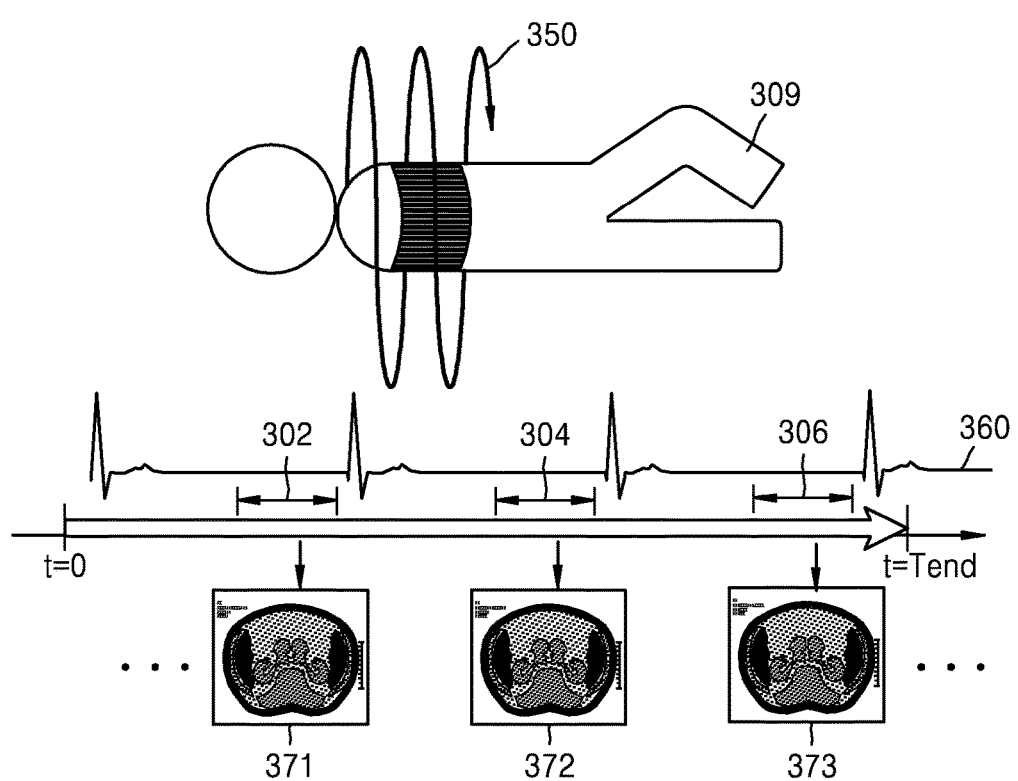

FIGS. 3A to 3C are views illustrating a method of processing a CT image according to exemplary embodiments.

There may be various scanning methods for CT imaging, for example, an axial scanning method and a helical scanning method.

FIG. 3A illustrates CT imaging by the helix scanning method. FIG. 3B illustrates CT imaging by the axial scanning method. FIGS. 3A and 3B illustrate an example in which the CT image processing apparatus performs the CT imaging by moving the table 105 in an axial direction of an object (or a patient) 309. As shown in FIG. 3A, an axis parallel with a lengthwise direction (or a toe-to-head direction 303) of the object 309 may be defined as a z-axis. Referring to FIG. 3B, the axial scanning method is a CT imaging process in which the CT image processing apparatus obtains the CT data by transmitting an X-ray to the object 309 and capturing the image while the table 105 is not moved, and then transmitting another X-ray for a predetermined period of time after moving the table by a predetermined distance from 307 to 308. The image processor 126 reconstructs CT images 331 and 932 by using the pieces of raw data acquired in sections 321 and 322. Electrocardiographic (ECG) gating may be used to acquire raw data that is used for reconstruction of an image.

Referring to FIG. 3A, the helical scanning method is a CT imaging process in which the CT image processing apparatus continues transmitting an X-ray and capturing the image while the table 105 is moved for a certain period of time. More specifically, the CT image processing apparatus moves the table 105, on which the object 309 (or a patient including the object) is positioned, at a certain speed for a certain period of time and captures the image by continuously transmitting an X-ray to the object 309 while the table is moving. As a result, the movement trajectory 305 of the X-ray light source may have a form of a helix.

FIG. 3C is a view to explain the data obtained by CT imaging according to the helical scanning method.

Referring to FIG. 3C, while the object 309 on the table 105 is moved, the X-ray generator 106 and the X-ray detector 108 rotates around the object 301. In this process, the movement trajectory 305 of the X-ray light source on the X-ray generator 106 may have a form of a helix. The data obtained according to the movement trajectory 305 from the X-ray detector 108 may be reconstructed into a cross-sectional image based on CT images 371, 372, and 373 by using the pieces of raw data acquired in sections 302, 304, and 306 of an ECG signal 360 by using the plurality of graphics processor units (GPUs).

Referring to FIG. 3C, the movement trajectory 305 may be divided into a plurality of periods 302, 304 and 306. The data obtained during the first period 302, the data obtained during the second period 304 and the data obtained during the third period 306 may be respectively processed in different GPUs. Hereinafter, an example is explained in which the three GPUs, i.e. a first GPU, a second GPU and a third GPU are used to reconstruct one cross-sectional image. When reconstructing one cross-sectional image by using the data obtained from each section of the movement trajectory 305, there is interdependence among each data source. More specifically, it is possible that by using the data obtained from the first period 302, the second period 304 and the third period 306, the CT image processing apparatus may reconstruct one cross-sectional image, i.e. one 3D CT image. In this case, each of the data obtained from the first period 302, the second period 304, and the third period 306 may be processed by each of the first GPU, the second GPU and the third GPU. By using the respectively processed data, the CT image processing apparatus may obtain one cross-sectional image. Therefore, when the first GPU does not normally operate when processing the data obtained in the first period 302 of the movement trajectory 305, the CT image processing apparatus many not reconstruct a 3D CT image because the data or the image which corresponds to the first period 302 is not obtained.

In another exemplary embodiment, by using the data obtained from each of the plurality of GPUs in subsequent periods in the movement trajectory 305, the CT image processing apparatus may perform another reconstruction operation. For example, the first GPU performs a first operation by using the data obtained from a subsequent period of the movement trajectory 305, the second GPU performs a second operation by using the data obtained from the subsequent period of the movement trajectory 305; and the third GPU performs a third operation by using the data obtained from the subsequent period of the movement trajectory 305. Here, the first operation, the second operation and the third operation may be operations of reconstructing the image required for a diagnosis of the object. In this case, when the first operation is not performed due to a malfunction of the first GPU, the CT image processing apparatus may not obtain the data or the image which corresponds to the first period 302.

Therefore, when the CT image processing apparatus processes data by using the plurality of GPUs, the CT image processing apparatus may not reconstruct a CT image when at least one GPU among the GPUs is malfunctioning. In particular, when the image processed in the malfunctioning GPU is an image that is needed for a diagnosis, the diagnosis by the CT image processing apparatus of the object may be impossible. Hereinafter, a method of controlling the operation of the plurality of GPUs such that a cross-sectional image is generated even when a GPU is out of order.

Figure 4:
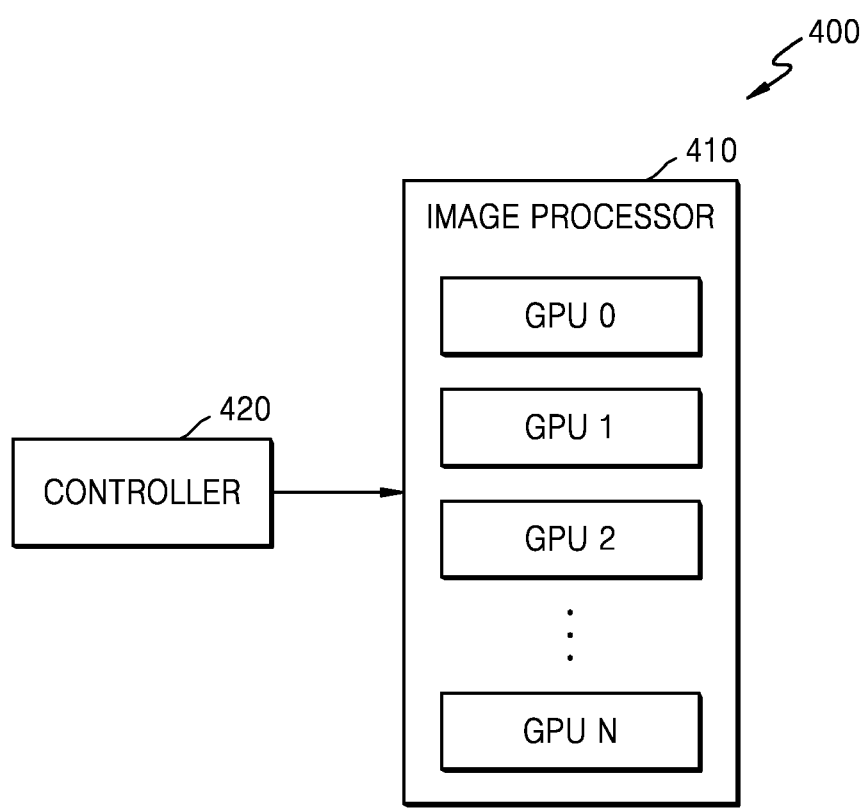
FIG. 4 is a block diagram of a CT image processing apparatus according to an exemplary embodiment.

FIG. 4 is a block diagram illustrating an apparatus for processing a medical image according to an exemplary embodiment.

The apparatus for processing a medical image according to an exemplary embodiment includes an electronic apparatus which may generate and process various medical images. In detail, the apparatus for processing a medical image may include equipment that is designed to obtain the image of an internal structure of an object. The apparatus for processing a medical image captures and processes the image of the structural details of a body, the internal organs and the flow of body fluids and displays the image to users. The users, for example, doctors, may diagnose medical conditions and diseases by using the image generated by the apparatus for processing a medical image.

The apparatus for processing a medical image may be a magnetic resonance imaging (MRI) device, a CT imaging device, an X-ray device, or an ultrasound diagnosis device, and may respectively process at least one an MRI image, a CT image, an X-ray image, or an ultrasound image.

Hereinafter, the procedure is explained by using an example in which the apparatus for processing a medical image is a CT image processing apparatus 400 for processing a tomography image.

Referring to FIG. 4, the CT image processing apparatus 400 may include an image processor 410 and a controller 420 according to an exemplary embodiment.

The CT image processing apparatus 400 may be included in the CT system 100, as shown in FIGS. 1 and 2. More specifically, the CT image processing apparatus 400 may include all types of medical imaging apparatuses which reconstruct images by using data obtained by using light which penetrates the object.

In other words, the CT image processing apparatus 400 may include all types of medical imaging apparatuses which reconstruct images by using projection data obtained by using light which penetrates the object. More specifically, the CT image processing apparatus 400 may include a CT device, an optical coherence tomography (OCT) device, or a positron emission tomography (PET)-CT device.

Therefore, the CT image obtained by the CT image processing apparatus 400, according to an exemplary embodiment, may include a CT image, an OCT image, or a PET image. In some exemplary embodiments, the CT image may include an image which shows the cross section of the object as any type of image obtainable through the CT imaging; and more specifically, may be a 2D or a 3D image.

Hereinafter, the image obtained from the CT imaging will be referred to as the cross-sectional image.

In some exemplary embodiments, when the CT image processing apparatus 400 is included in the CT system 100 as shown in FIG. 1, the image processor 410 shown in FIG. 2 may be included in the image processor 126 shown in FIG. 1, and the controller 420 may be included in the controller 118 shown in FIG. 1.

The image processor 410, according to an exemplary embodiment, may include processors which reconstruct the cross-sectional image based on the CT image obtained from the CT imaging of at least one object. In this specification, a processor may refer to a device which may perform the calculation needed to reconstruct the cross-sectional image. Examples of processors may include a GPU, a central processor (CPU), a micro processor unit (MPU), a micro controller unit (MCU), and a digital signal processor (DSP). Hereinafter, according to an exemplary embodiment, a detailed explanation is given with an example in which the processor is a GPU. The image processor 410 may include a plurality of GPUs GPU 0, GPU 1, GPU 2 . . . GPU N. In this context, CT data is data used for reconstructing the cross-sectional image, and may be projection data or a sinogram which is raw data obtained from the CT imaging.

In this context, the object may include a human being or an animal or a part of the human being or the animal which is the target of the CT imaging. In some exemplary embodiments, at least one object may include a plurality of objects. Hereinafter, a detailed explanation is given by using an example in which a first object refers to at least a part of a patient "X" and a second object refers to at least a part of a patient "Y" who is different from the patient "X."

The controller 420 monitors whether the plurality of GPUs normally function and, based on a result of the monitoring, may assign at least one of a primary operation which is a reconstruction stage of a cross-sectional image with a higher priority and a secondary operation which is a reconstruction stage of a cross-sectional image with a lower priority to at least one of the plurality of GPUs.

The controller 420 may control the primary operation which has a higher priority to be processed prior to the second operation. To this end, the controller 420 may assign the primary operation or the secondary operation to each of GPUs such that the number of GPUs which perform the primary operation exceeds the number of GPUs which perform the secondary operation. For example, controller 420 may assign the primary operation to four of a total of six GPUs and assign the secondary operation to the remaining two GPUs in response to detecting a malfunction of the GPUs.

The controller 420 may assign the primary operation and the secondary operation to the GPUs that are not found to be out of order among the plurality of GPUs when the controller 420 determines, based on the result of monitoring the GPUs, that at least one or more GPUs are malfunctioning. For example, the controller 420 may assign the primary operation to four GPUs that are not found to be out of order and the secondary operation to one GPU that is not found to be out of order when the controller 420 determines that one of the total of six GPUs is out of order.

As described above, the controller 420 may individually assign the operation of image reconstruction to each GPU based on the priorities. Accordingly, even if at least one or more GPUs are malfunctioning among the plurality of GPUs, the primary operation and the secondary operation may be still performed. An example of a method of assigning the primary and secondary operations will be explained in detail by referring to FIGS. 7 through 9.

The primary operation according to an exemplary embodiment refers to an operation of reconstructing the cross-sectional image which has a top priority (i.e. a first priority) among a plurality of operations of reconstructing the cross-sectional image. For example, the primary operation may be the operation of reconstructing the cross-sectional image of a first object based on the CT data obtained by CT imaging of the first object while the CT image processing apparatus 400 performs the CT imaging on the first object.

The reconstructing the cross-sectional image generated by the primary operation, is performed at the same time as the CT imaging so that users may verify in real time the reconstructed cross-sectional image. In other words, the reconstructed cross-sectional image of the first object generated by the primary operation may be displayed while the CT imaging is being performed. The primary operation may be referred to as a live reconstruction. Hereinafter, the reconstructed cross-sectional image generated by the primary operation is referred to as the first cross-section image.

The primary operation may be performed by using such reconstruction types as back-projection filtering and filtered back-projection, but these are just examples and the primary operation is not limited thereto.

The secondary operation according to an exemplary embodiment is an operation of reconstructing the cross-sectional image which has a second priority, and has a lower priority than the primary operation which has the top priority. In detail, the secondary operation is an operation of reconstructing the cross-sectional image which the user intends to further verify after verifying the first cross-sectional image. Since the secondary operation has a lower priority than the primary operation, the secondary operation may be performed slower than the primary operation. In some exemplary embodiments, the secondary operation is performed independently because the secondary operation is different from the primary operation. When the secondary operation is performed, the CT image processing apparatus may reconstruct the cross-sectional image which is not displayed during the process of CT imaging of the first object but displayed after the imaging is completed. Hereinafter, the reconstructed cross-sectional image generated by the secondary operation is referred to as a second cross-sectional image.

The secondary operation may be initiated concurrently with the live reconstruction of the first object. In some exemplary embodiments, the secondary operation may be initiated during and even after the live reconstruction of the first object. Initiating and/or controlling the secondary operation may be performed in response to by an input signal of the user.

The secondary operation according to an exemplary embodiment may include a scan reconstruction.

The scan reconstruction is an operation of reconstruction performed independently from the primary operation and refers to reconstructing the second cross-sectional image by using the CT data based on the reconstruction method which is different from the reconstruction method for the primary operation.

The user may boost the accuracy of diagnosis by verifying the image reconstructed by the scan reconstruction which is performed differently from the reconstruction by the live reconstruction. More specifically, live reconstruction and scan reconstruction are different in terms of methods of reconstructing the image, processing the image, and displaying the image which shows the identical object differently. The types of reconstruction used in the scan reconstruction may be selected by a user input. Therefore, when the user inputs corresponding to commands for a plurality of types of reconstruction executable by the scan reconstruction, the scan reconstruction may be performed multiple times.

In some exemplary embodiments, the scan reconstruction may be provided to post-process the removal of the artifacts of the cross-sectional image.

The scan reconstruction may be performed concurrently with the primary operation, because the scan reconstruction uses data identical to the data used for the CT imaging.

According to an exemplary embodiment, the secondary operation may include a post reconstruction.

The post reconstruction may be an operation performed to complement the live reconstruction when the user verifies the cross-sectional image reconstructed by live reconstruction, after the live reconstruction of the first object is completed. In some exemplary embodiments, the post reconstruction may be an operation of reconstruction performed to complement the scan reconstruction after the user verifies the cross-sectional image reconstructed by scan reconstruction.

When used with post reconstruction, the CT image processing apparatus may generate the second cross-sectional image of the first object, based on at least one of the CT data and the first cross-sectional image.

For example, when the user wants to remove noise from the reconstructed image obtained by the live reconstruction and/or scan reconstruction, or when the user wants to remove metal artifacts which appear on the reconstructed image, the user may perform the post reconstruction.

In some exemplary embodiments, the user may perform the post reconstruction to remove various artifacts which appear on the reconstructed cross-sectional image.

For example, when the user wants to remove the artifacts on the live reconstruction image, or when the user wants to remove the artifacts on the reconstructed cross-sectional image obtained by the scan reconstruction, the user may perform the post reconstruction to remove the artifacts. In addition, the user may perform the post reconstruction when selecting another reconstruction method that is different from the reconstruction methods used for the live reconstruction and scan reconstruction.

The aforementioned reconstruction method used for the scan reconstruction and/or post reconstruction may be a non-iterative reconstruction such as filtered back projection or an iterative reconstruction. In addition, the reconstruction of the image may be performed in many different ways, and is not limited to the specific methods described above.

Figure 5:
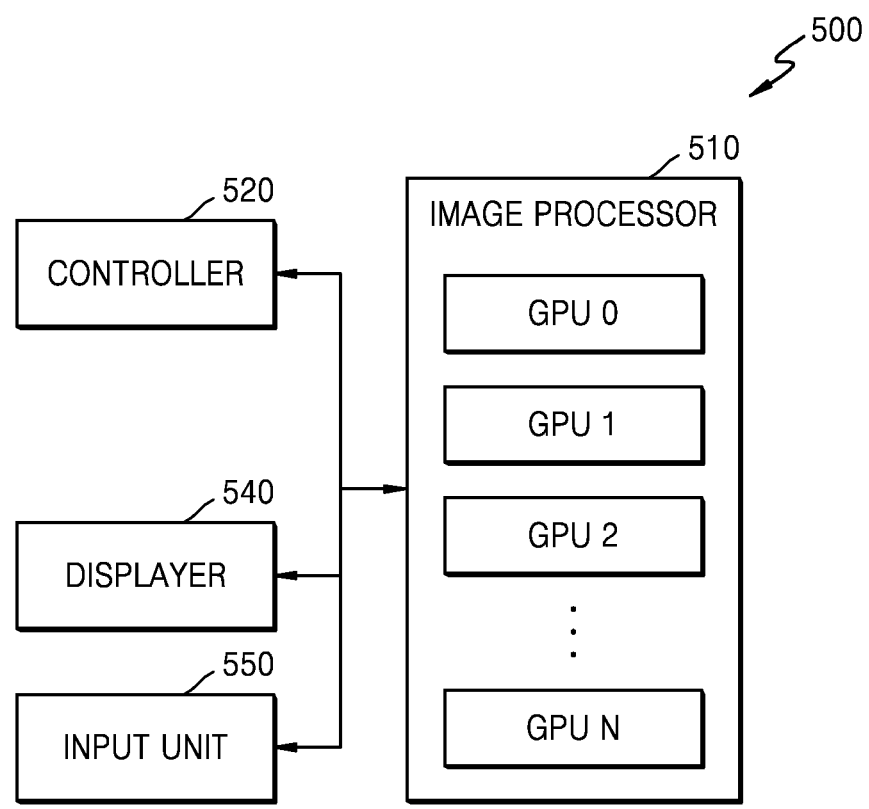
FIG. 5 is a block diagram of a CT image processing apparatus according to another exemplary embodiment.

FIG. 5 is a block diagram of a CT image processing apparatus 500 according to an exemplary embodiment.

Referring to FIG. 5, the CT image processing apparatus 500 according to an exemplary embodiment includes the image processor 510, the controller 520, the displayer 540 and the input unit 550.

The image processor 510 and the controller 520 shown in FIG. 5 may be similar to or substantially the same as the image processor 410 and the controller 420 shown in FIG. 4, respectively, and thus detailed descriptions thereof will be omitted. Similarly, the displayer 540 and the input unit 550 shown in FIG. 5 may be similar to or substantially the same as the input unit 128 and the displayer 130 of the CT system 100 shown in FIG. 1, respectively, and thus detailed descriptions thereof will be omitted.

The displayer 540 displays a predetermined screen. More specifically, the displayer 540 may display the reconstructed cross-sectional image. The reconstructed cross-sectional image may be the first cross-sectional image reconstructed by the primary operation or the second cross-sectional image reconstructed by the secondary operation.

The displayer 540 may display the first cross-sectional image reconstructed by the primary operation while the CT imaging of the first object is underway.

In some exemplary embodiments, the displayer 540 may display a user interface screen. For example, the displayer 540 may display a user interface screen for selecting the type of reconstructing and processing applicable to the scan reconstruction, a user interface screen for selecting the type of reconstructing and processing applicable to the live reconstruction, and a user interface screen for selecting the type of reconstructing and processing applicable to the post reconstruction. The displayer 540 may display the user interface screen for setting the assignment of the plurality of GPUs.

The displayer 540 may display a user interface screen which indicates a current status of the CT image processing apparatus 500. In detail, the displayer 540 may display the user interface screen which indicates the current operation status of each of the plurality of the GPUs of the CT image processing apparatus 500.

The displayer 540 may display an error message which informs the user of the malfunctioning GPUs when one or more of the plurality of the GPUs are detected to be out of order. When one or more of the plurality of the GPUs of the CT image processing apparatus 500 are detected to be out of order, the controller 520 may control the CT image processing apparatus to inform an external device or an external medical apparatus of malfunction occurring in the GPUs. In some exemplary embodiments, the controller 520 may transmit an alarm signal, via a communicator (132 in FIG. 2), to a user or a manufacturer of the CT image processing apparatus to indicate that one or more of the GPUs are detected to be out of order. For example, the alarm signal includes an auditory signal.

The input unit 550 may receive from the user predetermined data, requests, or commands. For example, the input unit 550 may receive the predetermined data or requests through the user interface screen.

Specifically, the input unit 550 may receive an input for the secondary operation and the image processor 510 may determine whether to perform the secondary operation and the method of reconstructing the image of the secondary operation based on the input.

The user may determine whether to perform the secondary operation and the method of reconstructing the image of the secondary operation when the user confirms the first cross-sectional image displayed on the displayer 540 after the primary operation is performed.

Figure 6:
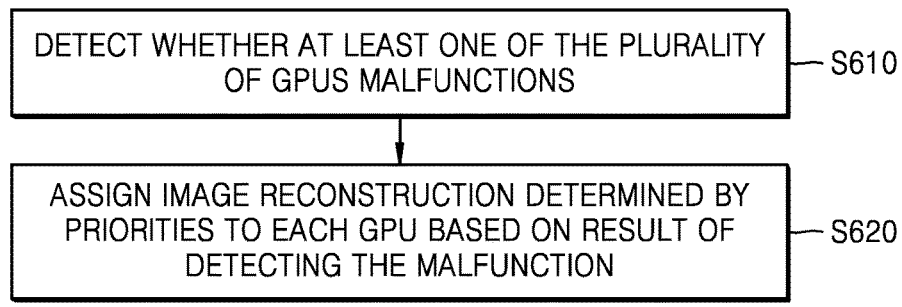
FIG. 6 is a flowchart of a method of processing a CT image according to an exemplary embodiment.

FIG. 6 is a flowchart of a method of processing a CT image according to an exemplary embodiment. The method of processing the CT image according to an exemplary embodiment may be used to reconstruct a cross-sectional image of an object based on CT data obtained by CT imaging at least one object.

Referring to FIG. 6, in operation S610, the CT image processing apparatus may detect whether at least one of the plurality of graphic processors (GPU) malfunction (S610). The plurality of GPUs may be included in the CT image processing apparatus to execute reconstructing of the cross-sectional image of the object. Operation S610 may be performed by the controller 410 of the CT image processing apparatus 400 or by the controller 510 of the CT image processing apparatus 500, according to an exemplary embodiment.

In operation S620, the CT image processing apparatus may assign image reconstruction determined by priorities to each GPU based on a result of detecting a malfunction (S620). More specifically, in operation S620 the CT image processing apparatus may assign to at least one of the plurality of GPUs at least one of either a primary operation which is the reconstruction stage of a cross-sectional image with a higher priority or a secondary operation which is the reconstruction stage of a cross-sectional image with a lower priority. Operation S620 may be performed by the controller 410 of the CT image processing apparatus 400 or by the controller 510 of the CT image processing apparatus 500, according to an exemplary embodiment.

Figure 7:
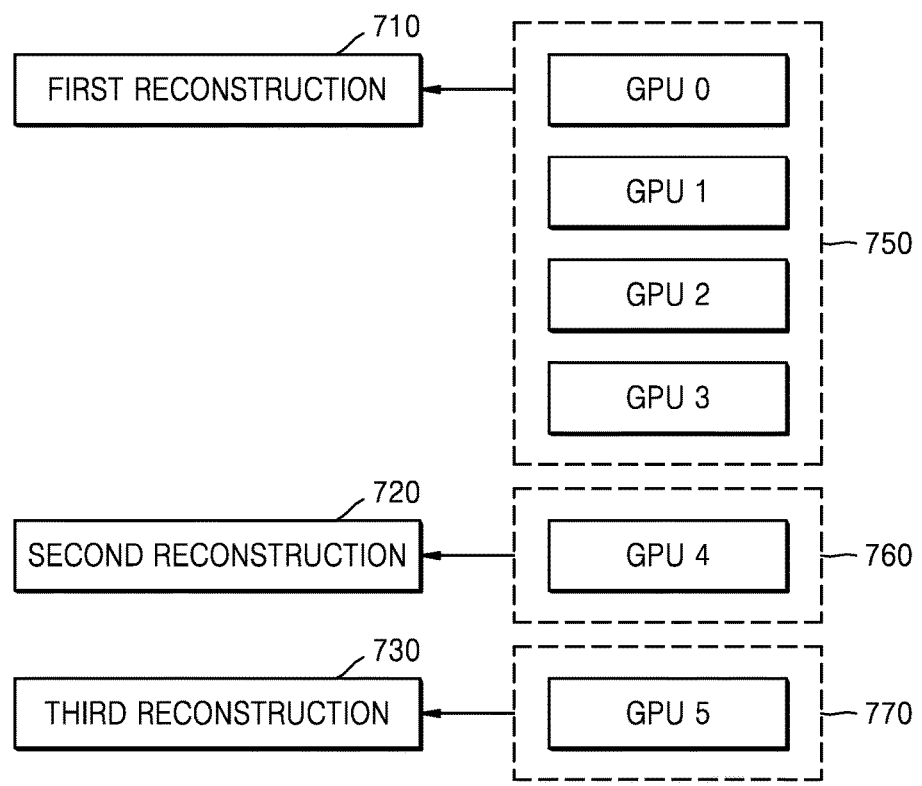
FIGS. 7, 8A, 8B, 9, and 10 are views illustrating examples of assigning an operation of image reconstruction based on priorities in a method of processing a CT image according to exemplary embodiments.

FIG. 7 is a view illustrating an example of assigning priorities in a method of processing a CT image according to an exemplary embodiment.

FIG. 7 illustrates assigning mage reconstruction operations to each of a total of six GPUs included in the CT image processing apparatus. FIG. 7 shows an example in which all of the six GPUs GPU 0, GPU 1, GPU 2, GPU 3, GPU 4, and GPU 5 normally operate.

First reconstruction 710 may refer to a reconstruction operation which has a first priority. For example, the first reconstruction 710 may be the aforementioned live reconstruction.

Second reconstruction 720 and third reconstruction 730 may refer to second-priority reconstruction operations which have a lower priority than the first priority. The second reconstruction 720 operation and the third reconstruction 730 operation may be included in the secondary operation.

For example, the second reconstruction 720 may be the aforementioned scan reconstruction. For example, the third reconstruction 730 may be the aforementioned post reconstruction.

The first reconstruction 710, which is an operation that has the first priority, may be assigned to the four GPUs 750 including GPU 0, GPU 1, GPU 2, and GPU 3 among the GPUs GPU 0 to GPU 5. The second reconstruction 720, which is an operation that has the second priority, may be assigned to a GPU 760 including GPU 4; 760 among the GPUs GPU 0 to GPU 5. The third reconstruction 730, which is an operation that has the second priority, may be assigned to a GPU 770 GPU 5 among the GPUs GPU 0 to GPU 5.

Accordingly, the number of GPUs included in the GPUs 750 which are assigned the first reconstruction 710 which has the first priority is greater than that of GPU included in the GPU 760 which is assigned the second reconstruction 720 which has the second priority and that of a GPU included in the GPU 770 which is assigned the third reconstruction 730 which has the second priority. Therefore, the first reconstruction 710 which has the first priority may be processed faster than the second reconstruction 720 and the third reconstruction 730.

Therefore, according to an exemplary embodiment, the live reconstruction may be processed faster than the scan reconstruction and the post reconstruction so that the user may verify the cross-sectional image in real time.

Figure 8A:
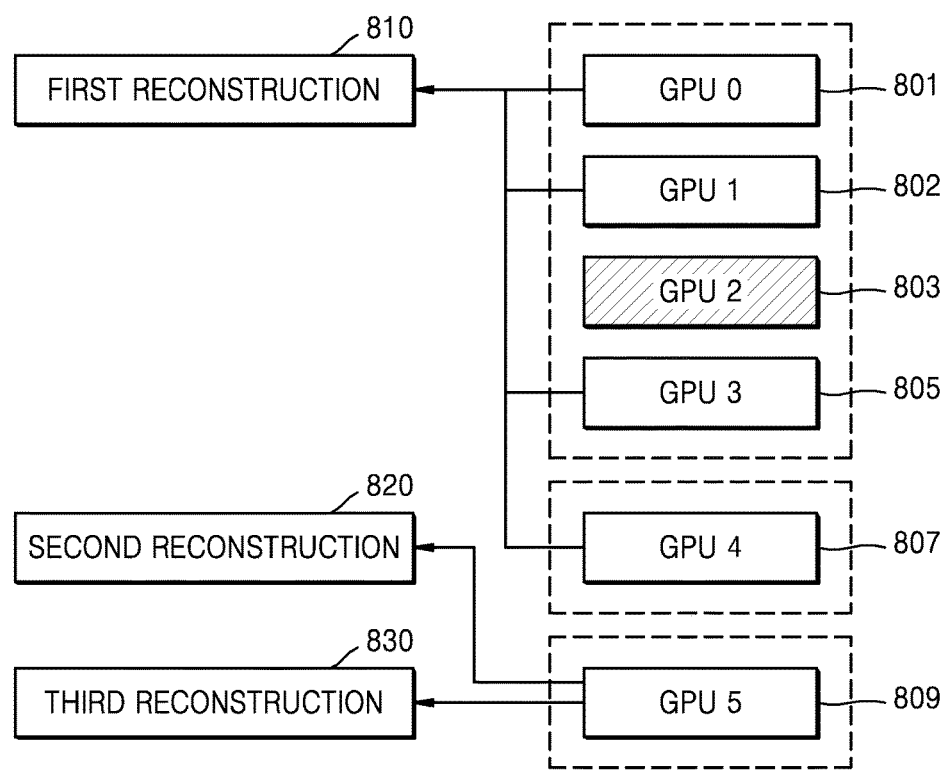

FIG. 8A is a view illustrating an example of assigning priorities in a method of CT image processing according to an exemplary embodiment.

FIG. 8A illustrates an example in which a GPU 2 803 is detected to be out of order while a GPU 0 801, GPU 1 802, GPU 3 805, GPU 4 807 and GPU 5 808 normally operate among a total of six GPUs GPU 0, GPU 1, GPU 2, GPU 3, GPU 4, and GPU 5.

When the GPU 2 803 in FIG. 8A is detected to be out of order, the CT image processing apparatus may assign the operation of reconstructing the image to each of the remaining GPUs GPU 0, GPU 1, and GPU 3 to GPU 5 except for the GPU 2 803 which is detected to be out of order.

For example, a first reconstruction 810 may be assigned to GPU 0 801, GPU 1 802, GPU 3 805, and GPU 4 807, while a second reconstruction 820 and a third reconstruction 830 may be assigned to the GPU 5 805.

According to an exemplary embodiment, when the second reconstruction 820 and the third reconstruction 830 which have lower priorities are assigned to the GPU 5 805, the GPU 5 805 may perform the third reconstruction 830 after the second reconstruction 820 is completed. For example, the CT image processing apparatus may be configured to control such that the post reconstruction is performed by the GPU 5 805 after the scan reconstruction is completed.

Accordingly, the CT image processing apparatus may ensure the first, second and third reconstruction operations normally function even when the GPU 2 803 is detected as being out of order, by assigning both the second and third reconstruction operations with lower priorities to the GPU 5 805.

At the same time, the CT image processing apparatus may maintain the speed of processing the first reconstruction operation regardless of whether a malfunction occurs in any of the GPUs GPU 1 to GPU 5, by assigning the first reconstruction operation to four GPUs GPU 0 801, GPU 1 802, GPU 3 805, and GPU 4 807.

Figure 8B:
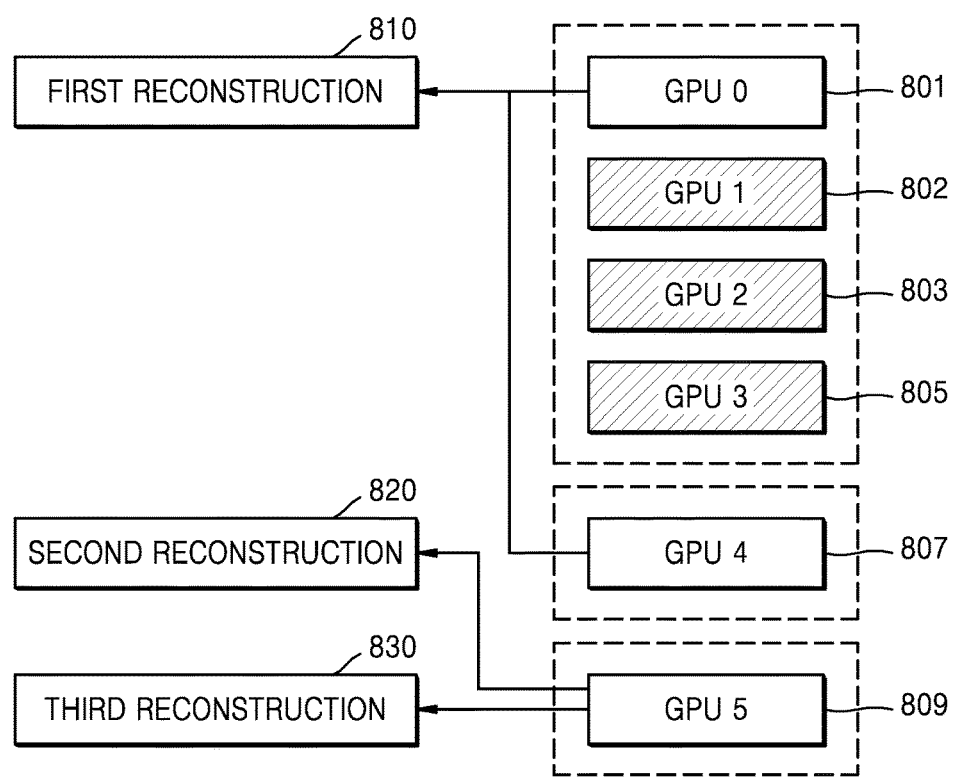

FIG. 8B is a view illustrating an example of assigning priorities in a method of processing a CT image according to an exemplary embodiment.

FIG. 8B illustrates an example in which GPU 0 801, GPU 4 807, and GPU 5 808 among six GPUs GPU 0, GPU 1, GPU 2, GPU 3, GPU 4, and GPU 5 normally operate while the remaining GPUs GPU 1 02, GPU 2 803, and GPU 3 805 are detected to be out of order.

When GPU 1 802, GPU 2 803, and GPU 3 805 shown in FIG. 8B are detected to be out of order, the CT image processing apparatus may assign an operation of reconstructing the image to each of the remaining three GPUs GPU 1 to GPU 3 except for the GPU 1 802, GPU 2 803, and GPU 3 805 which are detected to be out of order.

For example, the first reconstruction 810 may be assigned to GPU 0 801 and GPU 4 807, while the second reconstruction 820 and the third reconstruction 830 to the GPU 5 805.

An exemplary embodiment shown in FIG. 8B illustrates an example in which three GPUs among a total of six GPUs do not normally operate. Therefore, the CT image processing apparatus may assign two GPUs instead of four GPUs, to ensure the first, second and third reconstruction operations are performed properly.

According to an exemplary embodiment shown in FIGS. 8A and 8B, the first reconstruction operation is processed faster than the second and third reconstruction operations.

In other words, in the method of processing the CT image according to an exemplary embodiment, the CT image processing apparatus may assign the primary operation to as many GPUs as possible, based on the total number of GPUs and the number of GPUs detected to be out of order. In some exemplary embodiments, the CT image processing apparatus may assign the primary operation to more GPUs than the secondary operation.

Accordingly, the speed of processing the primary operation may be faster than that of the secondary operation with a lower priority.

Figure 9:
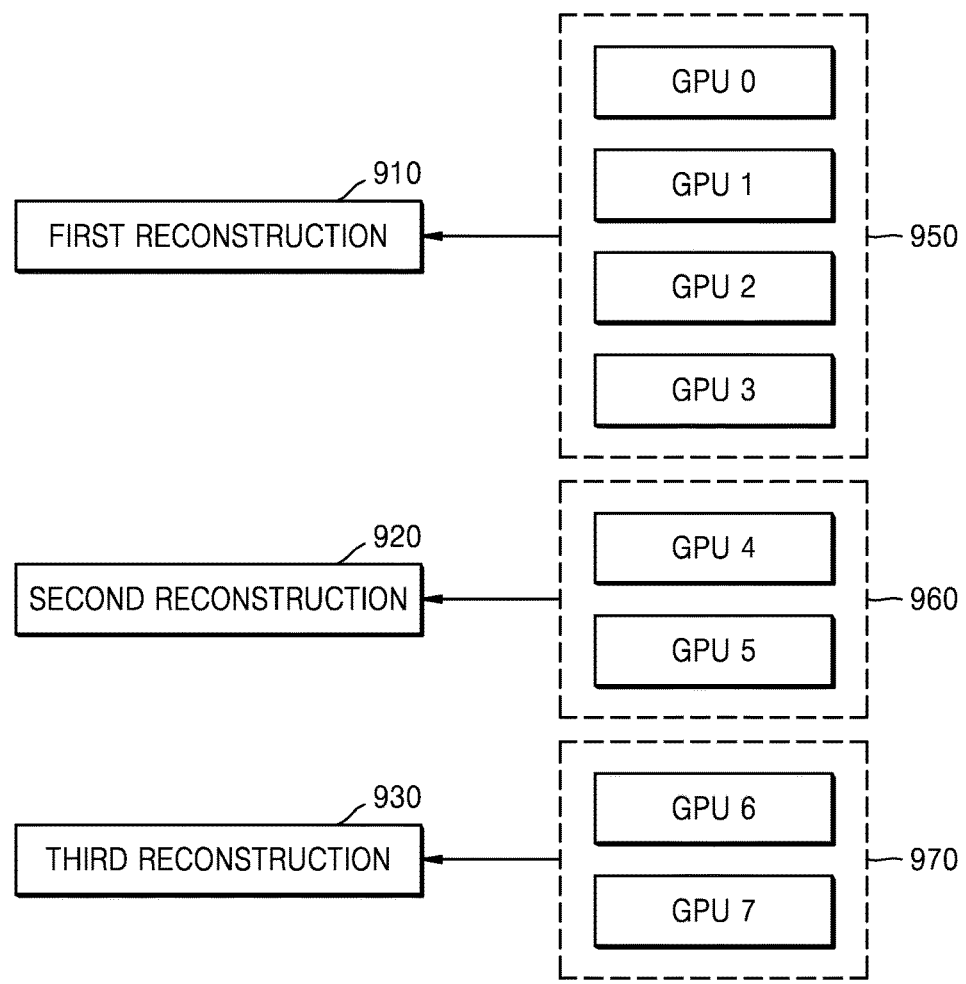

FIG. 9 is view illustrating an example of assigning priorities in a method of processing a CT image according to another exemplary embodiment.

FIG. 9 illustrates an example in which the CT image processing apparatus assigns an operation of reconstructing the image to each of eight GPUs. FIG. 9 illustrates an example in which all of eight GPUs GPU 0, GPU 1, GPU 2, GPU 3, GPU 4, GPU 5, GPU 6, and GPU 7 normally operate.

A first reconstruction 910 which has the first priority may be assigned to for GPUs 950 including GPU 0, GPU 1, GPU 2, and GPU 3 among the eight GPUs. A second reconstruction 720 which has the second priority may be assigned to two GPUs 960 including GPU 4 and GPU 5 among the eight GPUs GPU 0 to GPU 7. A third reconstruction 930 which has the second priority may be assigned to two GPUs 970 including GPU 6 and GPU 7 among the eight GPUs.

Similar to the exemplary embodiments described in FIGS. 7, 8A, and 8B, in FIG. 9, the number of GPUs 950 which are assigned the first reconstruction 910 having the first priority is greater than that of GPUs 960 which are assigned the second reconstruction 920 having the second priority and greater than that of GPUs 970 which are assigned the third reconstruction 930 which has the second priority. Therefore, the first reconstruction 910 which has the first priority may be processed faster than the second reconstruction 920 and the third reconstruction 930. In FIG. 9, two more GPUs are additionally included in the CT image processing apparatus than in the exemplary embodiments described in FIGS. 7, 8A and 8B, and the first reconstruction 910 may be assigned to the additionally included two GPUs.

Figure 10:
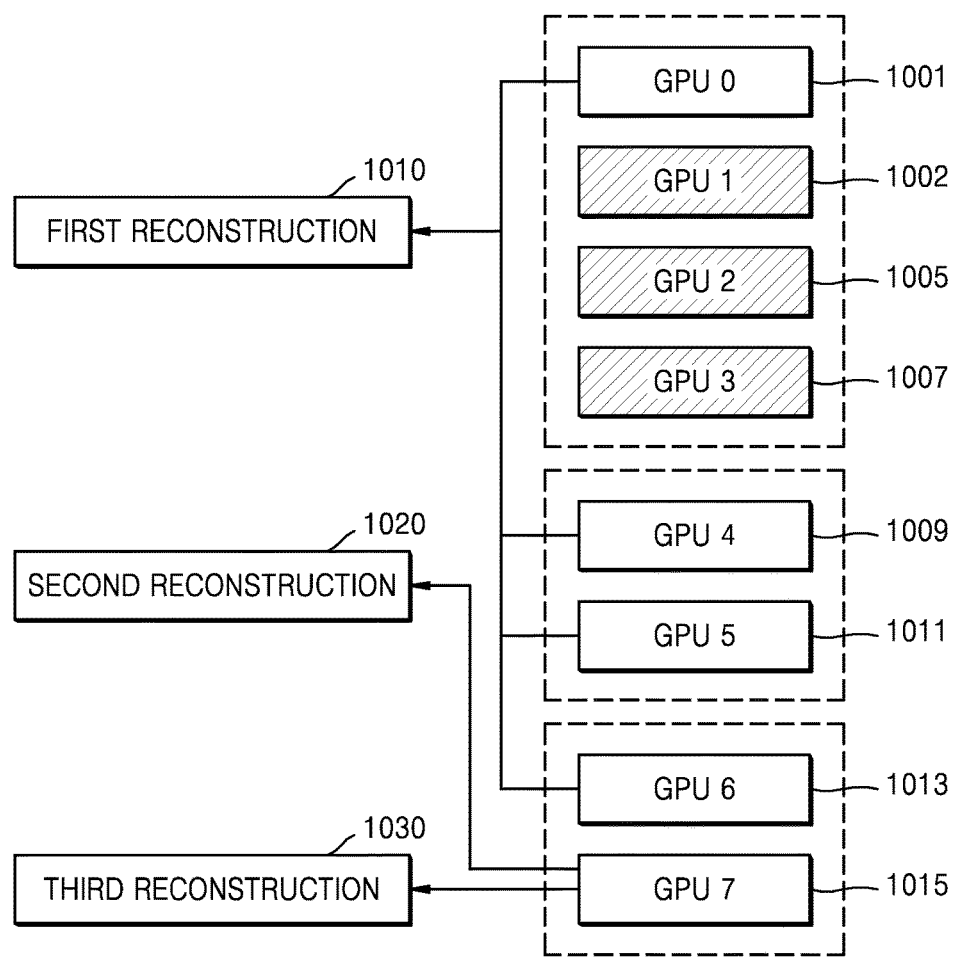

FIG. 10 is a view illustrating an example of assigning priorities in a method of processing a CT image according to another exemplary embodiment.

FIG. 10 illustrates an example in which GPU 0 1001, GPU 4 1009, GPU 5 1011, GPU 6 1013, and GPU 7 1015 among all of eight GPUs GPU 0, GPU 1, GPU 2, GPU 3, GPU 4, GPU 5, GPU 6, and GPU 7 normally operate while GPU 1 1003, GPU 2 1005, and GPU 3 1007 are detected to be out of order.

When the GPU 1 1003, GPU 2 1005 and GPU 3 1007 are detected to be out of order, the CT image processing apparatus may assign the operation of reconstructing the image to each of the remaining five GPUs except for the GPU 1 1003, GPU 2 1005, and GPU 3 1007 which are detected to be out of order.

For example, the CT image processing apparatus may assign a first reconstruction 1010 to GPU 0 1001, GPU 4 1009, GPU 5 1011 and GPU 6 1013 while assigning a second reconstruction 1020 and a third reconstruction 1030 to the GPU 7 1015.

The exemplary embodiment described in FIG. 10 illustrates an example in which three GPUs GPU 1 to GPU 3 do not normally operate among a total of eight GPUs GPU 0 to GPU 7. Therefore, the CT image processing apparatus may ensure that the first, second and third reconstruction operations are normally performed even when the GPU, which performs a primary operation, is out of order, by concurrently assigning both the second and third reconstruction operations having lower priorities to another GPU.

In FIG. 10, there are two more GPUs than in the exemplary embodiments described in FIGS. 7, 8A and 8B, and the CT image processing apparatus may maintain the speed of processing the first reconstruction operation the same regardless of whether a malfunction occurs in any of the GPUs GPU 0 to GPU 7 by assigning the first reconstruction operation to four GPUs GPU 0 and GPU 4 to GPU 6.

In the method of processing the CT image according to an exemplary embodiment, the CT image processing apparatus may assign the primary operation to as many GPUs as possible, based on the total number of GPUs and the number of GPUs detected to be out of order. In some exemplary embodiments, the CT image processing apparatus may assign the primary operation to more GPUs than the secondary operation.

Therefore, the first reconstruction operation which has the first priority may be processed faster than the second reconstruction operation.

Figure 11B:
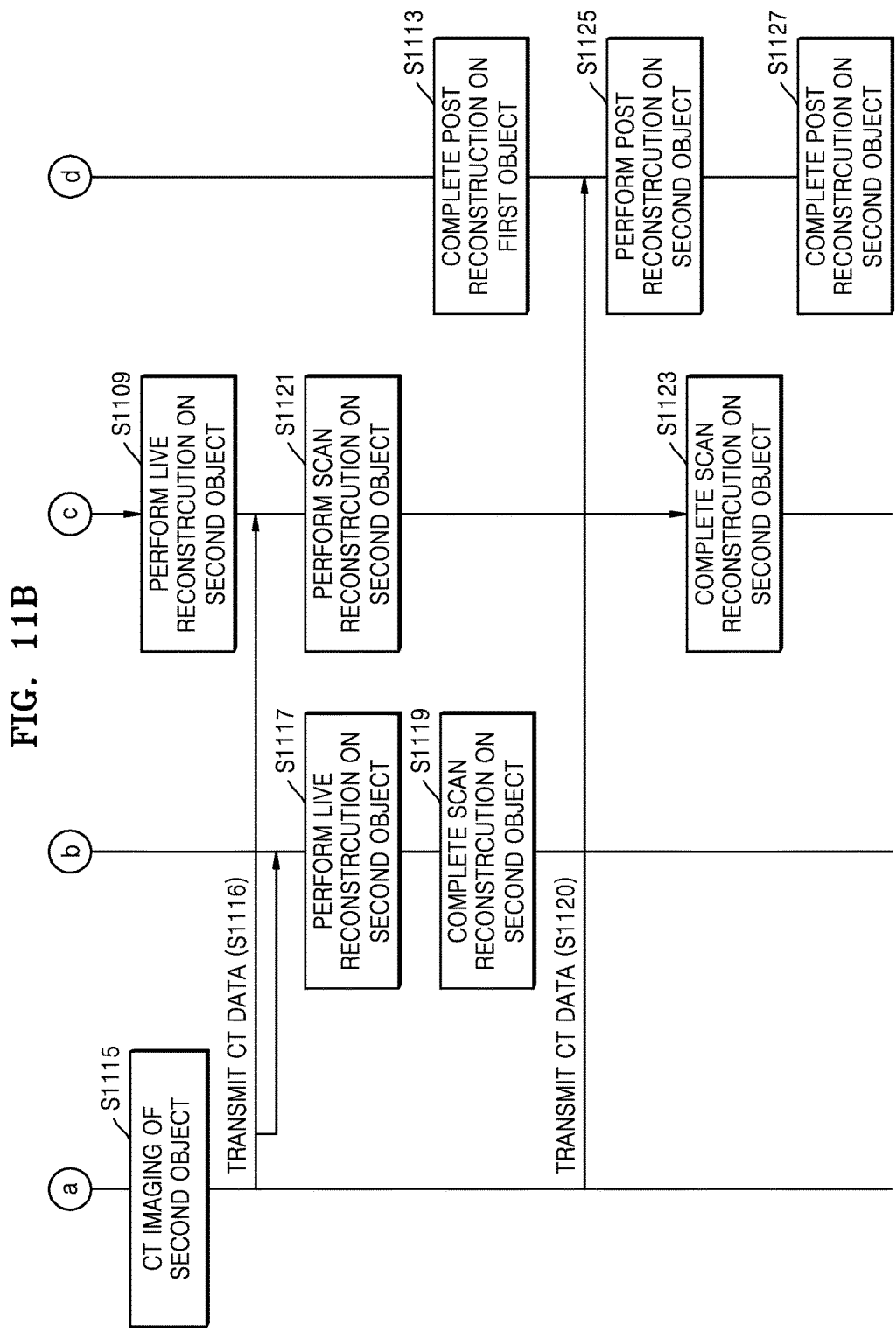
Figure 12A:
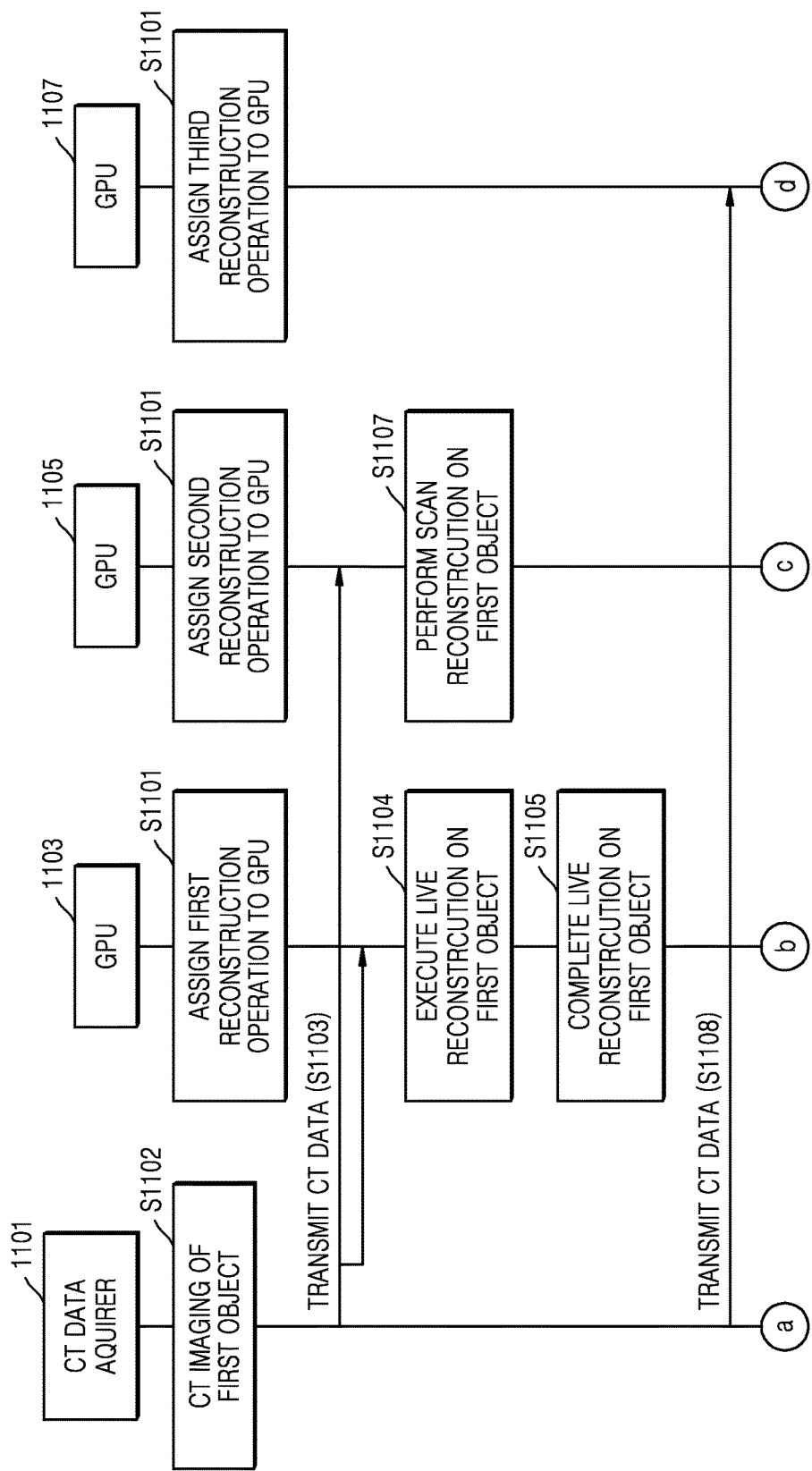

FIGS. 11A and 11B are sequence diagrams of a method of processing a CT image according to an exemplary embodiment. FIGS. 12A and 12B are sequence diagrams of a method of processing a CT image by a CT image processing apparatus according to another exemplary embodiment.

FIGS. 11A, 11B, 12A, and 12B illustrate a procedure in which a CT data acquirer 1101 acquires the CT data of first and second objects, and first, second and third reconstruction operations are performed by a plurality of GPUs in an image processor 410 or 510.

The CT data acquirer 1101 may acquire CT data by capturing an image of at least one object through CT imaging. The CT data acquirer 1101 shown in FIGS. 11A to 12B may be included in the gantry 102 shown in FIG. 2.

A GPU 1103 is a GPU which performs a first operation of reconstruction while a GPU 1105 is a GPU which performs a second operation of reconstruction and a GPU 1107 is a GPU which performs a third operation of reconstruction. Each of the GPU 1103, GPU 1105, and GPU 1107 may be multiple in number.

The first, second, and third reconstruction operations may correspond to the first, second, and third reconstruction operations which are described in relation to FIGS. 7 through 10. FIGS. 11A, 11B, 12A, and 12B illustrates an example in which the first reconstruction operation is a live reconstruction operation while the second reconstruction operation is a scan reconstruction operation and the third reconstruction operation is a post reconstruction operation.

FIGS. 11A and 11B illustrate an example in which the first, second, and third reconstruction operations are performed when the plurality of GPUs are not detected to be out of order. The GPU 1105 which performs the second operation of reconstruction may be different from the GPU 1107 which performs the third operation of reconstruction.

The first, second, and third reconstruction operations may be assigned to the plurality of GPUs (S1101). The first reconstruction operation 1102, the second reconstruction operation 1103, and the third reconstruction operation 1104 may be assigned according to the method which is described in relation to FIGS. 7 through 10.

Referring to FIGS. 11A and 11B, the CT data acquirer 1101 may perform the CT imaging of the first object (S1102). The CT data acquirer may transmit the CT data obtained from the first object to the GPU 1103 and the GPU 1105 (S1103).

In the GPU 1103 which is assigned the first reconstruction operation, the CT image processing apparatus may perform the live reconstruction on the first object, based on the CT data (S1104). In the GPU 1105 which is assigned the second reconstruction operation, the CT image processing apparatus may perform the live reconstruction of the first object, based on the CT data (S1107).

The CT data acquirer 1101 may transmit the CT data obtained with respect to the first object to the GPU 1107 (S1108). After the live reconstruction of the first object is completed (S1105), the CT data acquirer 1101 may perform the post reconstruction of the first object at the GPU 1107 (S1111). The CT data acquirer 1101 may complete the scan reconstruction of the first object at the GPU 1105 (S1109).

On the other hand, the CT data acquirer 1101 may perform the CT imaging on the second object that is different from the first object (S1115). In some exemplary embodiments, the CT data acquirer 1101 may transmit the CT data of the second object to the GPU 1103 and the GPU 1105 (S1116).

In a similar manner as described with respect to the first object, the live reconstruction may be performed also for the second object by the GPU 1103 (S1117). In some exemplary embodiments, the scan reconstruction may be performed concurrently also for the second object by the GPU 1105 (S1121).

While the live reconstruction and the scan reconstruction for the second object are being performed, the post reconstruction for the first object may be completed by the GPU 1107 (S1113).

The CT data acquirer 1101 may transmit the CT data obtained with respect to the second object to the GPU 1107 (S1108). After the live reconstruction of the second object is completed (S1119), the CT data acquirer 1101 may perform the post reconstruction of the second object in the GPU 1107 (S1125).

After the scan reconstruction is completed on the second object by the GPU 1105 (S1123), the post reconstruction may be completed on the second object by the GPU 1107 (S1127).

As described above with reference to FIGS. 7 through 10, it may take more time to perform the secondary operation (e.g., scan reconstruction and/or post reconstruction) which has lower priorities than to perform the primary operation (e.g., live reconstruction) which has the top priority. In other words, it may take more time to perform the scan reconstruction on the first object, to perform the post reconstruction on the first object, to perform the scan reconstruction on the second object, and to perform the post reconstruction on the second object than to perform the live reconstruction on the first object and/or the second object.

FIGS. 12A and 12B illustrate an example in which, when some of the plurality of GPUs are detected to be out of order, the first, second, and third reconstruction operations are performed. In this case, the GPU 1105 which performs the second operation of reconstruction may be identical with the GPU 1107 which performs the third operation of reconstruction in FIGS. 12A and 12B.

The exemplary embodiments of FIGS. 12A and 12B may be similar to or the same as the exemplary embodiments as shown in FIGS. 11A and 11B except for the fact that GPU 1105 and GPU 1107 may be identical. Therefore, the description below will focus on the differences therebetween.

First of all, the first, second, and third reconstruction operations may be assigned to the plurality of GPUs (S1101). The first reconstruction operation 1102, the second reconstruction operation 1103, and the third reconstruction operation 1104 may be assigned according to the method which is described in relation to FIGS. 7 through 10.

Referring to FIGS. 12A and 12B, the CT data acquirer 1101 may perform the CT imaging of the first object (S1102). The CT data acquirer 1101 may transmit the CT data obtained with respect to the first object to the GPU 1103 and the GPU 1105 (S1103).

By using the GPU 1103 which is assigned the first reconstruction operation, the CT image processing apparatus may perform the live reconstruction of the first object, based on the CT data (S1104). At the same time, by using the GPU 1105 which is assigned the second reconstruction operation, the CT image processing apparatus may perform the scan reconstruction of the first object, based on the CT data (S1107).

After the scan reconstruction on the first object is completed in the GPU 1105 (S1109), the post reconstruction on the first object may be performed (S1111). Once the post reconstruction on the first object is completed (S1113), the scan reconstruction on the second object, in turn, may be performed (S1121).

In other words, as the second operation of reconstruction and the third operation of reconstruction are performed by the identical GPU 1105, there is a time interval from a time point when the moment the live reconstruction on the first object is completed in operation S1104 to a time point when the post reconstruction is performed on the first object in operation S1111.

In some exemplary embodiments, the task of performing the scan reconstruction may not be initiated concurrently with the live reconstruction on the second object. Therefore, there may be a time interval from a time point when the scan reconstruction on the first object is completed in operation S1109 to a time point when the scan reconstruction on the second object is performed in operation S1121.

According to an exemplary embodiment shown in FIGS. 12A and 12B, as the live reconstruction which has the top priority may be processed faster than the second and third reconstruction operations, the live reconstruction on the second object may be performed (S1117) while the post reconstruction on the first object is performed (S1111).

In other words, it may be possible that while the cross-sectional image of a patient X is being post-processed, the user may verify a result of CT imaging on a patient Y by live reconstruction in real time.

Figure 13A:
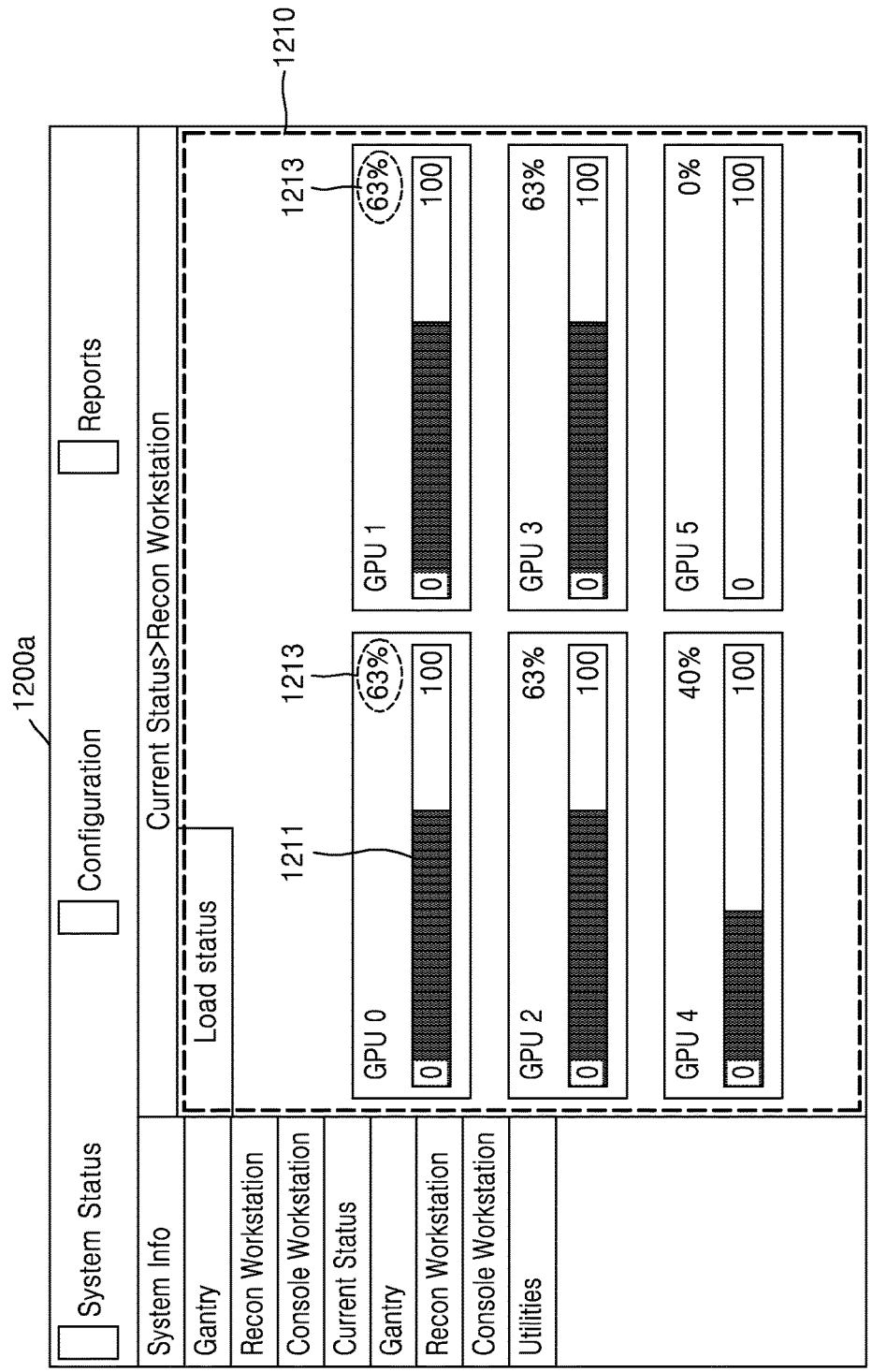
FIGS. 13A, 13B, and 13C are views illustrating a user interface screen which indicates an operation status of each of a plurality of graphics processor units (GPUs) of an apparatus for processing a medical image.
Figure 13B:
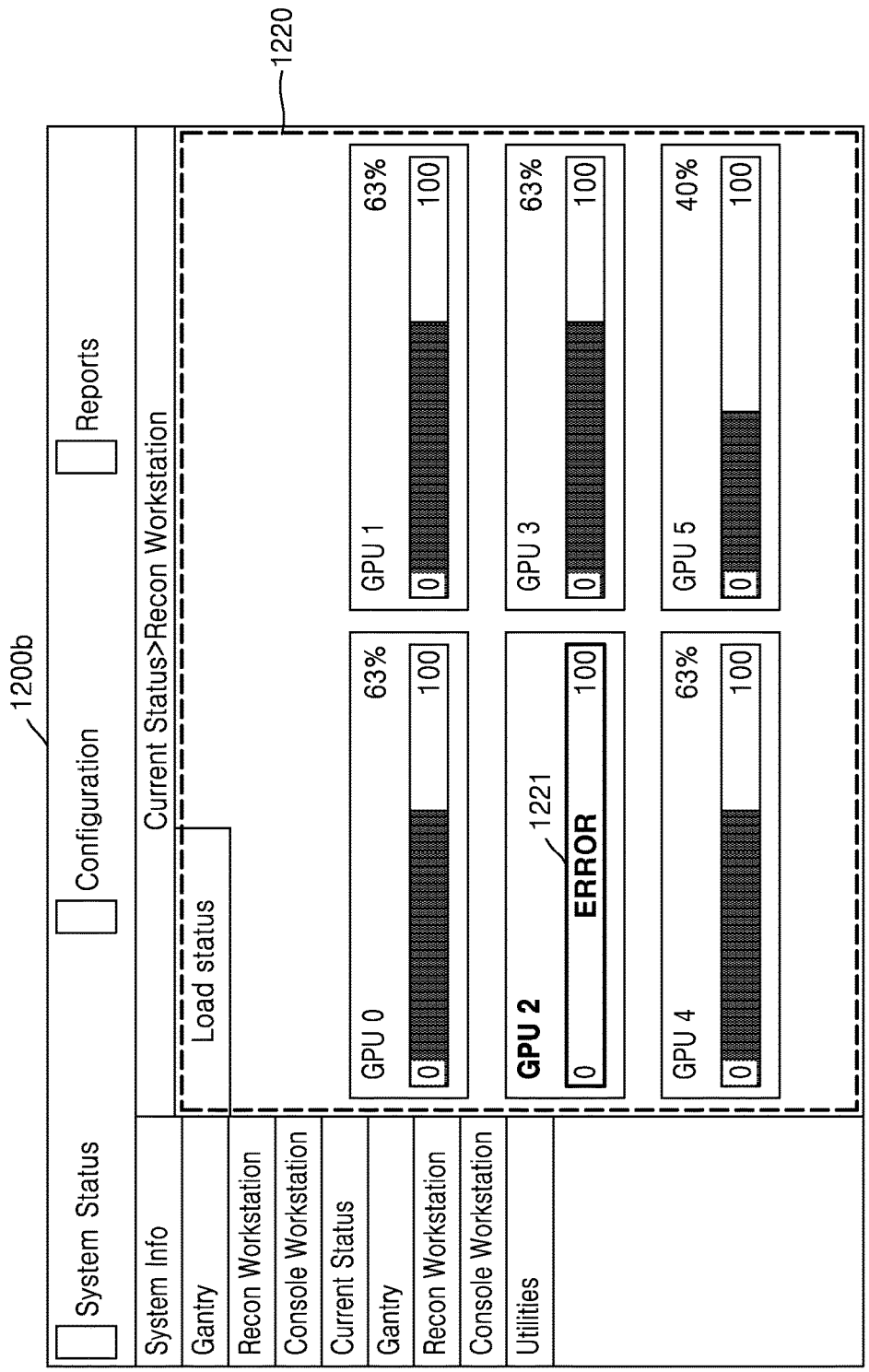
Figure 13C:
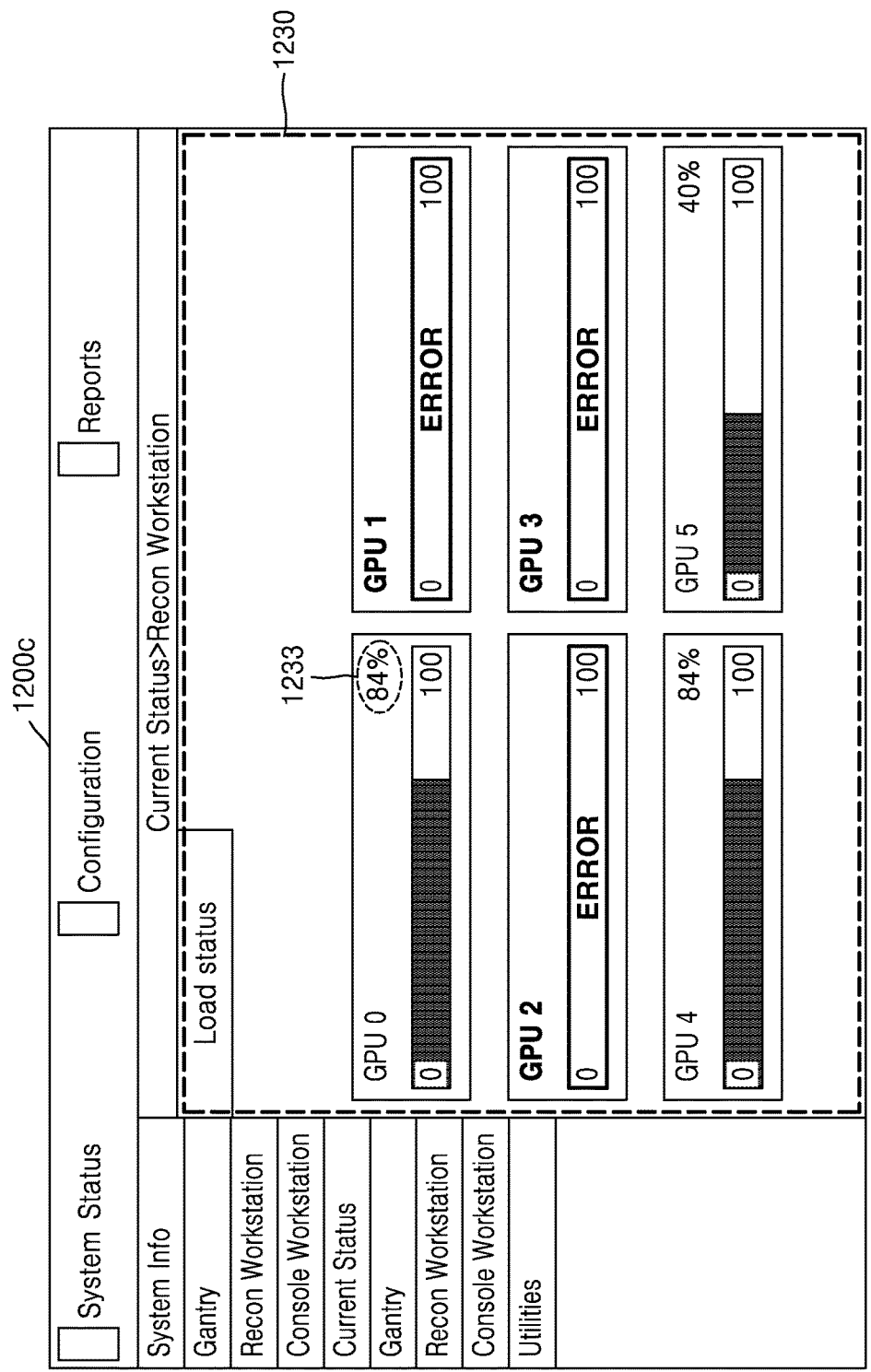

FIGS. 13A, 13B, and 13C are views illustrating a user interface screen which indicates an operation status of each of a plurality of GPUs of an apparatus for processing a medical image.

As described above, the displayer 540 may display the user interface screen which indicates a current status of the CT image processing apparatus 500. In detail, the displayer 540 may display the user interface screen which indicates the current operation status of each of the plurality of the GPUs of the CT image processing apparatus 500.

FIG. 13A illustrates a user interface screen 1200*a* which indicates the operation status of the CT image processing apparatus 500 which includes six GPUs.

The user interface screen 1200*a* may include a user interface 1210 which indicates a use status of the GPUs configured to reconstruct cross-sectional images.

Referring to FIG. 13A, all of six GPUs GPU 0, GPU 1, GPU 2, GPU 3, GPU 4, and GPU 5 of the CT image processing apparatus 500 may normally operate.

The CT image processing apparatus 500 may assign the first reconstruction operation which has a first priority (or a top priority) to four GPUs among the six GPUs GPU 0 to GPU 5. For example, the CT image processing apparatus 500 may assign a first reconstruction operation to GPU 0, GPU 1, GPU 2, and GPU 3. The first reconstruction operation may include a live reconstruction.

In some exemplary embodiments, the CT image processing apparatus 500 may assign a second reconstruction operation which has a second priority (or a second highest priority) to one GPU among the six GPUs GPU 0 to GPU 5. For example, the CT image processing apparatus 500 may assign the second reconstruction operation to the GPU 4. The second reconstruction operation may include a scan reconstruction.

In some exemplary embodiments, the CT image processing apparatus 500 may assign a third reconstruction operation which has a second priority (or a lowest priority) to one GPU among the six GPUs GPU 0 to GPU 5. For example, the CT image processing apparatus 500 may assign the third reconstruction operation to the GPU 5. The third reconstruction operation may include a post reconstruction.

The displayer 540 may display a use rate for each of the GPUs of the CT image processing apparatus 500. In detail, the displayer 540 may display an indicator bar 1211 which indicates the use rate of the GPU, along with the use rate 1213 of the GPU.

Referring to FIG. 13A, for example, while the CT image processing apparatus 500 is performing the first reconstruction operation, the use rate of the GPU 0, GPU 1, GPU 2, and GPU 3 may be 63%, for each of the GPUs. While the CT image processing apparatus 500 is performing the second reconstruction operation, the use rate of the GPU 4 may be 40%. While the CT image processing apparatus 500 is not performing the third reconstruction operation, the use rate of the GPU 5 may be 0%.

FIG. 12B illustrates a user interface screen 1200*b* which shows the operation status of the CT image processing apparatus 500 which includes six GPUs.

The user interface screen 1200*b* may include a user interface 1220 which indicates the use status of GPUs GPU 0, GPU 1, GPU 2, GPU 3, GPU 4, and GPU 5 to reconstruct the cross-sectional image.

Referring to FIG. 13B, the GPU 0, the GPU 1, the GPU 3, the GPU 4, and the GPU 5 among the GPUs GPU 0 to GPU 5 of the CT image processing apparatus 500 may normally operate while the GPU 2 may not normally operate.

The displayer 540 may display an error message which informs the user of the malfunctioning GPU when one or more of the plurality of the GPUs GPU 0 to GPU 5 are detected to be out of order.

For example, as shown in FIG. 13B, the displayer 540 may display an error message 1221 which informs the user of the malfunction of the GPU 2 when the GPU 2 is detected to be out of order.

The CT image processing apparatus 500 may assign the image reconstruction operation to each of the remaining five GPUs except for the GPU 2 which is detected to be out of order.

For example, the CT image processing apparatus 500 may assign the first reconstruction operation to the GPU 0, the GPU 1, the GPU 3, and the GPU 4. In an exemplary embodiment, the first reconstruction operation may include the live reconstruction. The CT image processing apparatus 500 may assign the second and third reconstruction operations concurrently to the GPU 5. For example, the second reconstruction operation may include the scan reconstruction, and the third reconstruction operation may include the post reconstruction.

FIG. 13C illustrates a user interface screen 1200*c* which shows the operation status of the CT image processing apparatus 500 which includes six GPUs.

The user interface screen 1200*c* may include the user interface 1230 which indicates the use status of the GPUs which reconstruct cross-sectional images.

Referring to FIG. 13C, the GPU 0, the GPU 4, and the GPU 5 among the GPUs GPU 0 to GPU 5 of the CT image processing apparatus 500 may normally operate while the GPU 1, the GPU 2, and the GPU 3 may not normally operate.

The CT image processing apparatus 500 may assign the image reconstruction operation to each of the remaining 3 GPUs except for the GPU 1, GPU 2, and GPU 3 which are detected to be out of order, when the GPU 1, GPU 2, and GPU 3 are detected to be out of order.

For example, the CT image processing apparatus 500 may assign the first reconstruction operation to the GPU 0 and GPU 4. In an exemplary embodiment, the first reconstruction operation may include the live reconstruction. The CT image processing apparatus 500 may concurrently assign the second and third reconstruction operations to the GPU 5. For example, the second reconstruction operation may include the scan reconstruction, and the third reconstruction operation may include the post reconstruction.

The CT image processing apparatus 500 may assign the first reconstruction operation to two GPUs instead of four GPUs compared to the exemplary embodiments of FIGS. 13A and 13B, when three GPUs among all of the six GPUs GPU 0 to GPU 5 are detected to be out of order.

When the 3 GPUs are out of order as shown in FIG. 13C, a use rate 1233 of the GPU 0 shown in FIG. 13C may be higher than a use rate 1213 of the GPU 0 shown in FIG. 13A.

The user may monitor to determine which one of the GPUs included in the CT image processing apparatus 500 is out of order, through the user interface screens 1200a, 1200b, and 1200c as shown in FIGS. 13A to 13C. In some embodiments, the user may monitor a use amount of the pluralities of the GPUs during the reconstruction operation of the CT image processing apparatus 500.

The exemplary embodiments can be written as computer programs and can be implemented in general-use digital computers that execute the programs using a non-transitory computer readable recording medium.

Examples of the non-transitory computer readable recording medium include magnetic storage media (e.g., ROMs, floppy disks, hard disks, etc.), optical recording media (e.g., compact disk (CD)-ROMs, or digital versatile disks (DVDs)), etc.

At least one of the components, elements or units represented by a block as illustrated in FIGS. 2, 4, and 5 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. An apparatus for processing a medical image, the apparatus comprising:
    an image processor comprising a plurality of processors, each of the plurality of processors being configured to be assigned to one of a first operation having a first priority and a second operation having a second priority lower than the first priority, to reconstruct a cross-sectional image of an object; and
    a controller configured to monitor whether a malfunction occurs among the plurality of processors, and configured to, when the malfunction occurs in a processor assigned to the first operation, reassign the first operation to at least one of the plurality of processors such that a number of the plurality of processors assigned to the second operation is reduced.

2. The apparatus of claim 1, wherein the controller is configured to reassign the first operation to the at least one of the plurality of processors, such that the first operation is firstly performed.

3. The apparatus of claim 2, wherein, when the controller is configured to reassign the first operation to the at least one of the plurality of processors except for a processor in which the malfunction is detected.

4. The apparatus of claim 1, further comprising a displayer configured to display the reconstructed cross-sectional image.

5. The apparatus of claim 4, wherein the plurality of processors are configured to reconstruct the cross-sectional image of the object based on computed tomography (CT) data obtained by performing a CT imaging on the object.

6. The apparatus of claim 5, wherein the displayer is configured to display a first cross-sectional image generated by using the first operation while the CT imaging is being performed on the object.

7. The apparatus of claim 6, wherein the displayer is configured to display a second cross-sectional image generated by the second operation, the second operation being performed on the object after the CT imaging of the object is completed.

8. The apparatus of claim 7, wherein the second operation comprises a scan reconstruction, and
    wherein the scan reconstruction is performed to reconstruct the second cross-sectional image by using the CT data in a manner different from reconstructing the first cross-sectional image by using the first operation.

9. The apparatus of claim 8, wherein the second operation further comprises post reconstruction by which the second cross-sectional image of the object is generated based on at least one of the CT data and the first cross-sectional image.

10. The apparatus of claim 9, wherein the controller is configured to control a processor assigned to the second operation to perform the post reconstruction after performing the scan reconstruction.

11. The apparatus of claim 1, wherein the controller is configured to reassign the first operation such that the first operation is assigned to a greater number of a processor than a number of a processor assigned to the second operation.

12. The apparatus of claim 1, wherein the controller is configured to reassign the first operation based on a total number of the plurality of processors and a number of a processor in which the malfunction is detected.

13. The apparatus of claim 1, wherein the controller is configured to reassign the first operation such that a number of the plurality of processors assigned to the first operation is maintained regardless of whether the malfunction occurs among the plurality of processors.

14. The apparatus of claim 13, wherein the controller is configured to maintain a speed at which the cross-sectional image of the object is generated by the first operation regardless of whether the malfunction occurs among the plurality of processors.

15. The apparatus of claim 1, further comprising:
an input unit configured to receive an input indicating the second operation,
wherein the image processor is configured to determine an image reconstruction method of the second operation, based on the input.

16. A method of processing a medical image, the method comprising:
detecting whether a malfunction occurs among a plurality of processors, each of the plurality of processors being configured to be assigned to one of a first operation having a first priority and a second operation having a second priority lower than the first priority, to reconstruct a cross-sectional image of an object, and
when the malfunction is detected in a processor assigned to the first operation based on a result of the detecting, reassigning the first operation to at least one of the plurality of processors such that a number of the plurality of processors assigned to the second operation is reduced.

17. The method of claim 16, wherein the reassigning comprises reassigning the first operation to the at least one of the plurality of processors, such that the first operation is firstly performed.

18. The method of claim 17, wherein the reassigning comprises reassigning the first operation to the at least one of the plurality of processors except for a processor in which the malfunction is detected.

19. The method of claim 15, further comprising displaying the reconstructed cross-sectional image.

20. The method of claim 19, wherein the plurality of processors are configured to reconstruct the cross-sectional image of the object based on CT data obtained through a CT imaging of the object.

21. The method of claim 20, wherein the displaying comprises displaying a first cross-sectional image generated by the first operation while the CT imaging is being performed on the object.

22. The method of claim 21, wherein the displaying comprises displaying a second cross-sectional image obtained through the second operation, the second operation being performed on the object after the CT imaging is completed.

23. The method of claim 22, wherein the second operation comprises scan reconstruction, and
the scan reconstruction is performed by reconstructing the second cross-sectional image by using the CT data in a manner different from reconstructing the first cross-sectional image by using the first operation.

24. The method of claim 23, wherein the second operation further comprises post reconstruction by which the second cross-sectional image of the object is generated based on at least one of the CT data and the first cross-sectional image.

25. The method of claim 24,
wherein a processor assigned to the second operation is configured to perform the post reconstruction after the scan reconstruction is completed.

26. The method of claim 16, wherein, after the reassigning, a number of the processor assigned to the first operation is greater than a number of a processor assigned to the second operation.

27. The method of claim 16, wherein the reassigning comprises reassigning the first operation to the at least one of the plurality of processors based on a total number of the plurality of processors and a number of a processor in which the malfunction is detected.

28. The method of claim 16, wherein a number of the processor assigned to the first operation is maintained regardless of whether the malfunction occurs among the plurality of processors.

29. The method of claim 28, wherein a speed at which the cross-sectional image of the object is generated by the first operation is maintained regardless of whether the malfunction occurs among the plurality of processors.

30. The method of claim 16, further comprising:
receiving an input indicating the second operation, and
determining an image reconstruction method of the second operation, based on the input.

31. A tomography apparatus comprising:
a scanner configured to acquire an image of an object by performing a tomography scan on the object;
an image processor comprising a plurality of processors, each of the plurality of processors being configured to be assigned to one of a plurality of reconstruction operations on the object, to reconstruct a cross-section image of the object, the plurality of reconstruction operations comprises a first reconstruction operation having a first priority and a second reconstruction operation having a second priority lower than the first priority among the plurality of reconstruction operations; and
a controller configured to, in response to detecting a malfunction in a processor assigned to the first reconstruction operation, reassign the first reconstruction operation to at least one of the plurality of processors based on a total number of the plurality of processors and a number of the processor in which the malfunction is detected, such that a number of the plurality of processors assigned to the second reconstruction operation is reduced.

32. The tomography apparatus of claim 31, wherein the plurality of reconstruction operations differ from each other with respect to at least one from among an image reconstruction method, an image processing method, and an image displaying method.

33. The tomography apparatus of claim 31,
wherein the controller is configured to reassign the first reconstruction operation to the at least one of the plurality of processors such that a number of a processor that performs the first reconstruction operation, among the plurality of processors except for the processor in which the malfunction is detected, is greater than a number of a processor that performs the second reconstruction operation.

* * * * *